US012142447B2

(12) United States Patent
Hotta et al.

(10) Patent No.: US 12,142,447 B2
(45) Date of Patent: Nov. 12, 2024

(54) SWITCH

(71) Applicant: Mitsubishi Electric Corporation, Tokyo (JP)

(72) Inventors: Katsuki Hotta, Tokyo (JP); Shinya Watanabe, Tokyo (JP); Takashi Inaguchi, Tokyo (JP); Katsutoshi Ikarashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 289 days.

(21) Appl. No.: 17/781,044

(22) PCT Filed: Dec. 2, 2020

(86) PCT No.: PCT/JP2020/044843
§ 371 (c)(1),
(2) Date: May 31, 2022

(87) PCT Pub. No.: WO2021/149362
PCT Pub. Date: Jul. 29, 2021

(65) Prior Publication Data

US 2022/0415597 A1 Dec. 29, 2022

(30) Foreign Application Priority Data

Jan. 23, 2020 (JP) ................................. 2020-008922

(51) Int. Cl.
*H01H 50/38* (2006.01)
*H01H 50/54* (2006.01)

(52) U.S. Cl.
CPC ............ *H01H 50/38* (2013.01); *H01H 50/54* (2013.01)

(58) Field of Classification Search
CPC .......... H01H 50/38; H01H 50/54; H01H 1/20; H01H 9/302; H01H 9/342; H01H 50/546; H01H 9/443
(Continued)

(56) References Cited

U.S. PATENT DOCUMENTS 8,853,585 B2 * 10/2014 Tachikawa ............. H01H 9/443 335/201
9,087,655 B2 7/2015 Enomoto et al.
(Continued)

FOREIGN PATENT DOCUMENTS

JP 60-194849 U 12/1985
JP 2011-204478 A 10/2011
(Continued)

OTHER PUBLICATIONS

International Search Report and Written Opinion mailed on Feb. 22, 2021, received for PCT Application PCT/JP2020/044843, Filed on Dec. 2, 2020, 11 pages including English Translation.

*Primary Examiner* — Shawki S Ismail
*Assistant Examiner* — Lisa N Homza
(74) *Attorney, Agent, or Firm* — XSENSUS LLP

(57) ABSTRACT

A switch includes a first fixed contactor, a second fixed contactor, a movable contactor, permanent magnets, and a yoke. The movable contactor extends in a first direction, includes a first movable contact at a first end portion, and is provided to be contactable with and separatable from the first fixed contactor in a second direction. The permanent magnets are arranged to sandwich the movable contactor, and to cause their surfaces facing the movable contactor in the third direction of the movable contactor to have the same polarity. The yoke surrounds a periphery of the movable contactor in the first direction and the third direction and is connected to surfaces of the permanent magnets on opposite sides of their surfaces facing the movable contactor. The
(Continued)

yoke includes a protrusion protruding toward the movable contactor at a position facing the first end portion of the movable contactor in the first direction.

13 Claims, 28 Drawing Sheets

(58) Field of Classification Search
USPC .......................................................... 335/201
See application file for complete search history.

(56) References Cited

U.S. PATENT DOCUMENTS

2019/0131093 A1* 5/2019 Minowa ................. H01H 50/20
2019/0131094 A1* 5/2019 Minowa ............... H01H 50/045
2019/0131095 A1* 5/2019 Minowa ................. H01H 50/18
2019/0131096 A1* 5/2019 Minowa ................. H01H 50/54
2019/0131097 A1* 5/2019 Minowa ................. H01H 50/04
2019/0148095 A1* 5/2019 Minowa ................. H01H 50/14
335/185
2019/0206633 A1* 7/2019 Hoffmann .............. H01H 9/443
2020/0273650 A1* 8/2020 Tanaka ................. H01H 50/045
2021/0098217 A1* 4/2021 Omari ..................... H02P 25/18
2021/0151271 A1* 5/2021 Kodama ................ H01H 50/54
2021/0287864 A1* 9/2021 Werner ................ H01H 50/023
2021/0358707 A1* 11/2021 Sakai ..................... H01H 9/443
2021/0375569 A1* 12/2021 Ozaki .................. H01H 50/443
2022/0139655 A1* 5/2022 Hoffmann ............ H01H 50/546
335/131
2022/0208494 A1* 6/2022 Yoo ........................ H01H 50/18
2022/0216023 A1* 7/2022 Huang ................... H01H 50/36
2022/0230827 A1* 7/2022 Yoo ...................... H01H 51/065
2023/0298839 A1* 9/2023 Yoo ........................ H01H 50/54
335/177
2023/0326696 A1* 10/2023 Shimizu ................. H01H 50/38
335/201
2024/0105409 A1* 3/2024 Schoechert ............ H01H 50/36
2024/0177957 A1* 5/2024 Hoffmann ................ H01H 1/06

FOREIGN PATENT DOCUMENTS

JP 2012-160427 A 8/2012
JP 2015-49940 A 3/2015
JP 5806562 B2 11/2015
JP 2016-134308 A 7/2016

* cited by examiner

SWITCH

CROSS-REFERENCE TO RELATED APPLICATIONS

The present application is based on PCT filing PCT/JP2020/044843, filed Dec. 2, 2020, which claims priority to JP 2020-008922, filed Jan. 23, 2020, the entire contents of each are incorporated herein by reference.

FIELD

The present invention relates to a switch disposed between an electric power supply and a load.

BACKGROUND

There has been known a switch that extinguishes an arc caused when contacts separate from each other by extending the arc by a magnetic field. Patent Literature 1 discloses a switch that includes: a contact block including a pair of fixed contactors each having a fixed contact, a movable contactor having a pair of movable contacts, and operation member that is connected to the movable contactor and brings the movable contact into contact with or separates the movable contact from the fixed contact; a magnetic field generation means that generates a magnetic field in the vicinity of the contact block; and a magnetic field line guide member. The magnetic field generation means generates a magnetic field between the fixed contact and the movable contact in a direction along an extending direction of the movable contactor. The magnetic field line guide member is provided along an outer wall of an arc-extinguishing chamber case.

CITATION LIST

Patent Literature

Patent Literature 1: Japanese Patent Application Laid-open No. 2011-204478

SUMMARY

Technical Problem

By the way, in a technique described in the above-listed Patent Literature 1, the magnetic field line guide member is disposed along a magnetic field line passing through a contact pair of one fixed contact and the movable contact that comes into contact with or separates from the fixed contact. However, there is a demand for a switch in which arc driving force for driving arc discharge generated immediately after the start of current interruption is increased, and arc discharge interruption performance is improved regardless of an energization direction of an electric current flowing through the movable contactor, as compared with the technique described in Patent Literature 1.

The present invention has been made in view of the above circumstances, and an object of the present invention is to provide a switch enabled to increase the arc driving force for driving the arc discharge generated immediately after the start, of the current interruption, and improve the arc discharge interruption performance regardless of the energization direction of the current flowing through the movable contactor as compared with that of the conventional technique.

Solution to Problem

In order to solve the above-described problems and achieve the object, the present invention provides a switch comprising: a first fixed contactor including a first fixed contact; a second fixed contactor disposed at an interval in a first direction aligned with the first fixed contactor; a movable contactor extending in the first direction, including a first movable contact provided at a position facing the first fixed contact at a first end portion, and provided to be able to come into contact with and separate from the first fixed contactor in a second direction perpendicular to the first direction; at least a pair of permanent magnets arranged to sandwich the movable contactor and to cause their surfaces facing the movable contactor in a third direction perpendicular to the first direction and the second direction of the movable contactor to have an identical polarity; and a yoke made of a magnetic material surrounding a periphery of the movable contactor in the first direction and the third direction and connected to surfaces of the permanent magnets on opposite sides of surfaces facing the movable contactor, wherein the yoke includes a protrusion protruding toward the movable contactor at a position facing the first end portion of the movable contactor in the first direction.

Advantageous Effects of Invention

According to the present invention, there is an advantageous effect that the arc driving force for driving the arc discharge generated immediately after the start of the current interruption can be increased, and the arc discharge interruption performance can be improved regardless of the energization direction of the current flowing through the movable contactor as compared with that of the conventional technique.

DESCRIPTION OF EMBODIMENTS

Hereinafter, switches according to embodiments of the present invention will be described in detail with reference to the drawings. Note that, the invention is not necessarily limited by these embodiments.

First Embodiment

Figure 1:
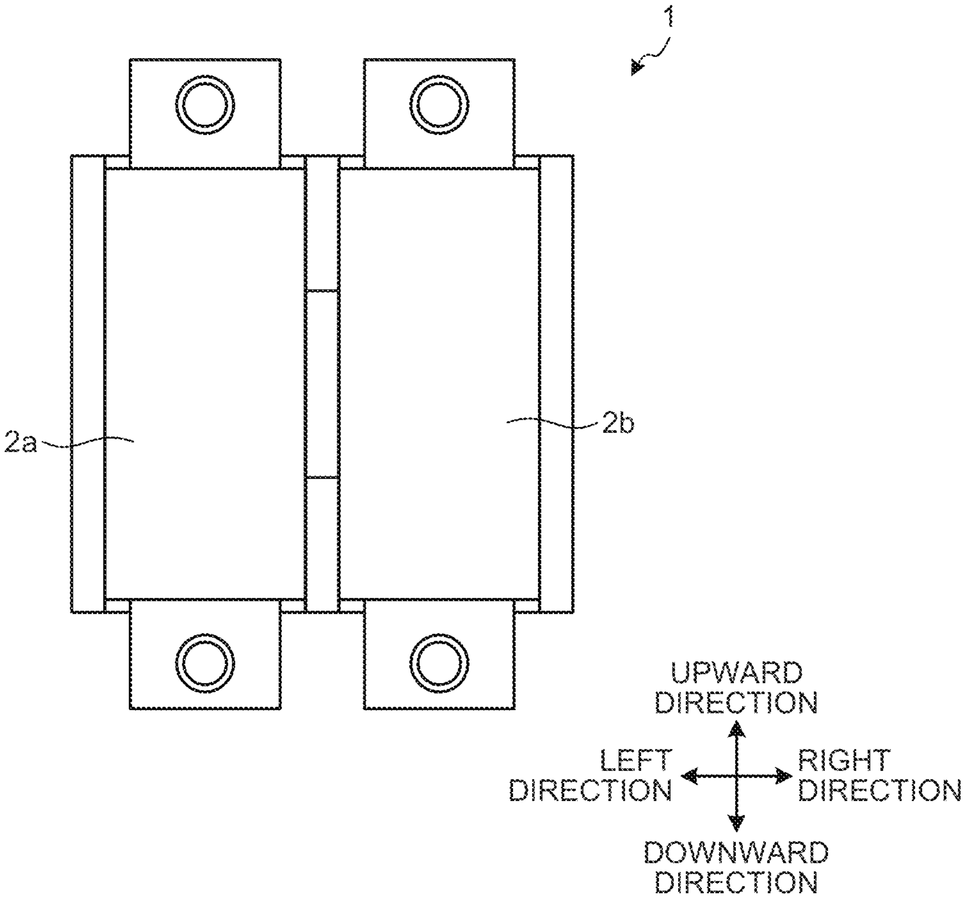
FIG. 1 is a front view illustrating an example of an external appearance of a switch according to a first embodiment.

FIG. 1 is a front view illustrating an example of an external appearance of a switch according to a first embodiment. Note that, in the following, an up-down direction and a left-right direction are defined as directions orthogonal to each other. In addition, a direction orthogonal to the up-down direction and the left-right direction is defined as a front-rear direction. Specifically, a direction in which a movable contact described later can move, which corresponds to a direction in which the movable contact and a fixed contact described later come in contact with or come out of contact with each other, is defined as a front-rear direction. A direction that is a transverse direction crossing the front-rear direction and corresponds to a direction along the longitudinal direction of a movable contactor is defined as an up-down direction. A direction that is a transverse direction crossing the front-rear direction and corresponds to a direction along a lateral direction of the movable contactor is defined as a left-right direction. In addition, the front-rear direction is a generic term for a frontward direction and a rearward direction representing directions opposite to each other, the up-down direction is a generic term for an upward direction and a downward direction representing directions opposite to each other, and the left-right direction is a generic term for a leftward direction and a rightward direction representing directions opposite to each other. Further, the up-down direction corresponds to a first direction, the front-rear direction corresponds to a second direction, and the left-right direction corresponds to a third direction.

A switch 1 includes a first-phase arc-extinguishing chamber 2*a* and a second-phase arc-extinguishing chamber 2*b* adjacent to each other. The first-phase arc-extinguishing chamber 2*a* and the second-phase arc-extinguishing chamber 2*b* basically have their respective internal configurations similar to each other, and the switch 1 basically has a symmetrical shape in the up-down direction and a symmetrical shape in the left-right direction. Note that, the switch 1 only needs to include at least one arc-extinguishing chamber. In addition, in the following, the first-phase arc-extinguishing chamber 2*a* and the second-phase arc-extinguishing chamber 2*b* will be referred to as arc-extinguishing chamber or chambers 2 in a case where there is no need to distinguish between the first-phase and second-phase arc-extinguishing chambers 2*a* and 2*b*.

Figure 2:
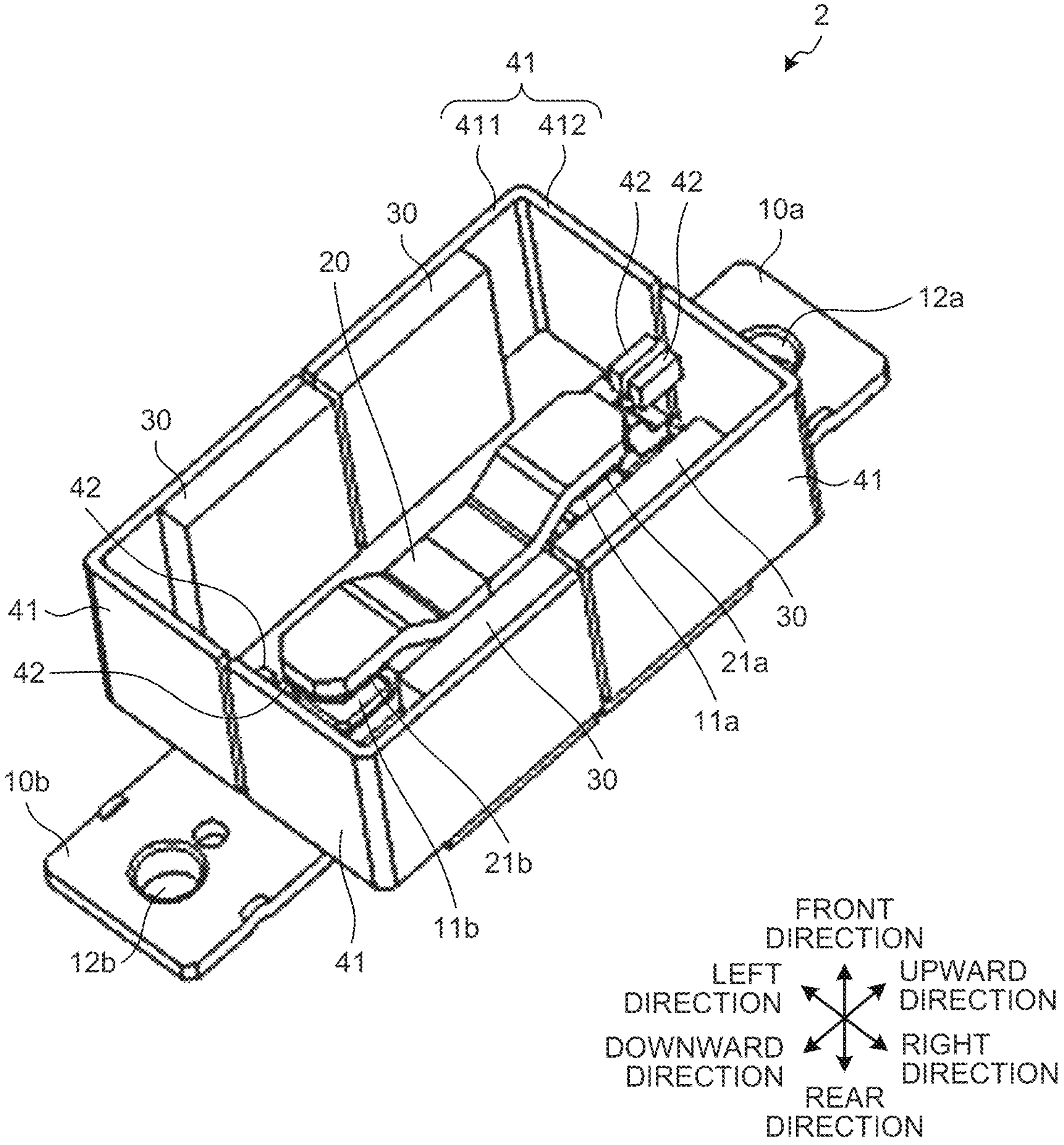
FIG. 2 is a perspective view illustrating an example of an internal configuration of an arc-extinguishing chamber of the switch according to the first embodiment.
Figure 3:
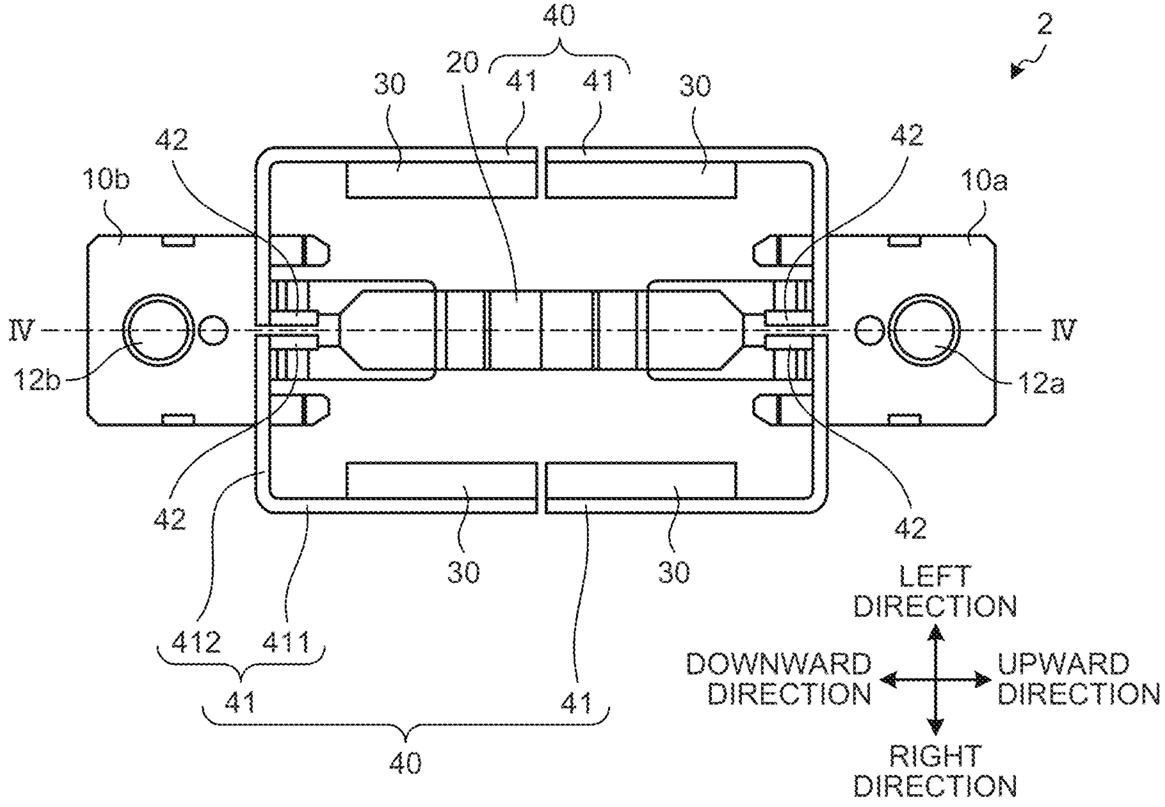
FIG. 3 is a front view illustrating the example of the internal configuration of the arc-extinguishing chamber of the switch according to the first embodiment.
Figure 4:
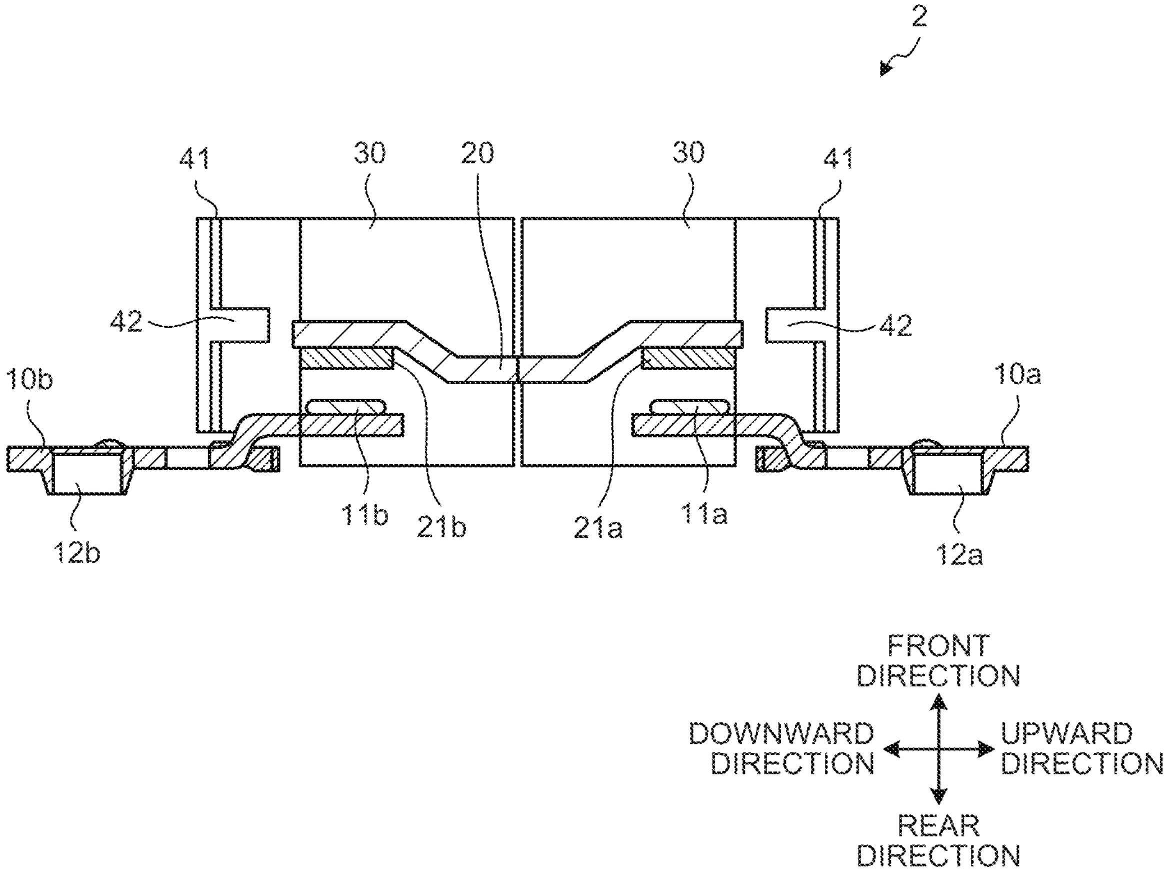
FIG. 4 is a cross-sectional view taken along a line IV-IV of FIG. 3.

FIG. 2 is a perspective view illustrating an example of an internal configuration of an arc-extinguishing chamber of the switch according to the first embodiment, FIG. 3 is a front view illustrating the example of the internal configuration of the arc-extinguishing chamber of the switch according to the first embodiment, and FIG. 4 is a cross-sectional view taken along a line IV-IV of FIG. 3. The arc-extinguishing chamber 2 of the switch 1 includes a first fixed contactor 10*a*, a second fixed contactor 10*b*, a movable contactor 20, permanent magnets 30, and a magnetic yoke 40.

The first fixed contactor 10*a* is formed of a plate-shaped member extending in the up-down direction and having a step structure near the center in the up-down direction, and has a rectangular shape when viewed in the front-rear direction. The first fixed contactor 10*a* is formed of, for example, an electrically conductive material such as copper or aluminum, an alloy using any of them as a base material, or the like. The first fixed contactor 10*a* includes a first fixed contact 11*a* at an end portion on a side in the up-down direction where the second fixed contactor 10*b* is disposed. The first fixed contact 11*a* is provided on a front surface of the first fixed contactor 10*a* in the frontward direction, and has a plate shape. The first fixed contact 11*a* is formed of, for example, silver or an alloy thereof. The first fixed contactor 10*a* has a terminal 12*a* at another end portion in the up-down direction. For example, a wiring line on a power supply side is connected to the terminal 12*a*.

The second fixed contactor 10*b* is formed of a plate-shaped member extending in the up-down direction and having a step structure near the center in the up-down direction, and has a rectangular shape when viewed in the front-rear direction. The second fixed contactor 10*b* is formed of, for example, an electrically conductive material such as copper or aluminum, an alloy using any of them as a base material, or the like. The second fixed contactor 10*b* is disposed at a predetermined interval from the first fixed contactor 10*a* in the up-down direction. That is, the first fixed contactor 10*a* and the second fixed contactor 10*b* are disposed on one and the same straight line. The second fixed contactor 10*b* has a second fixed contact 11*b* at an end portion on a side in the up-down direction where the first fixed contactor 10*a* is disposed. The second fixed contact 11*b* is provided on a front surface of the second fixed contactor 10*b* in the frontward direction, and has a plate shape. The second fixed contact 11*b* is formed of, for example, silver or an alloy thereof. The second fixed contactor 10*b* has a terminal 12*b* at another end portion in the up-down direction. A wiring line (not illustrated) on a load side is connected to the terminal 12*b*. In the following, in a case where the first fixed contactor 10*a* and the second fixed contactor 10*b* are not distinguished from each other, the first fixed contactor 10*a* and the second fixed contactor 10*b* are referred to as fixed contactors 10*a* and 10*b*. In addition, in a case where the first fixed contact 11*a* and the second fixed contact 11*b* are not distinguished from each other, the first fixed contact 11*a* and the second fixed contact 11*b* are referred to as fixed contacts 11*a* and 11*b*.

The movable contactor 20 is formed of a plate-shaped member extending in a direction along the up-down direction along which the first fixed contact 11*a* and the second fixed contact 11*b* are aligned, and having a uniform thickness in the front-rear direction. The movable contactor 20 has a structure in which a central portion in the up-down direction is recessed in the rearward direction as compared with end portions. The movable contactor 20 has a rectangular shape when viewed in the front-rear direction. The movable contactor 20 is formed of, for example, an electrically conductive material such as copper or aluminum, or an alloy using any of them as a base material. The movable contactor 20 is disposed at a predetermined interval from the first fixed contactors 10*a* and the second fixed contactors 10*b* in the frontward direction. The movable contactor 20 has a first, movable contact 21*a* having a plate shape at one end portion that is a first end portion in the up-down direction, and a second movable contact 21*b* having a plate shape at the other end portion that is a second end portion. The first movable contact 21*a* and the second movable contact 21*b* are provided on a rear surface of the movable contactor 20 in the rearward direction. The first movable contact 21*a* and the second movable contact 21*b* are formed of, for example, silver, an alloy thereof, or the like. In the following, in a case where the first movable contact 21*a* and the second movable contact 21*b* are not distinguished from each other, the first movable contact 21*a* and the second movable contact 21*b* are referred to as movable contacts 21*a* and 21*b*.

The first fixed contact 11*a* and the first movable contact 21*a* are opposed to each other in the front-rear direction. The first movable contact 21*a* is provided to be able to come into contact with and separate from the first fixed contact 11*a*. The second fixed contact 11*b* and the second movable contact 21*b* are opposed to each other in the front-rear direction. The second movable contact 21*b* is provided to be able to come into contact with and separate from the second fixed contact 11*b*.

The permanent magnets 30 are located in the left-right direction of the movable contactor 20 in such a manner as to sandwich the movable contactor 20. A pair, of the permanent magnets 30 are arranged in the left-right direction on an upper half of the movable contactor 20 in the up-down direction with the movable contactor 20 interposed therebetween, and another pair of the permanent magnets 30 are arranged in the left-right direction on a lower half of the movable contactor 20 in the up-down direction with the movable contactor 20 interposed therebetween. Surfaces of the paired permanent magnets 30 on the movable contactor 20 side have the sarnie polarity.

Figure 5:
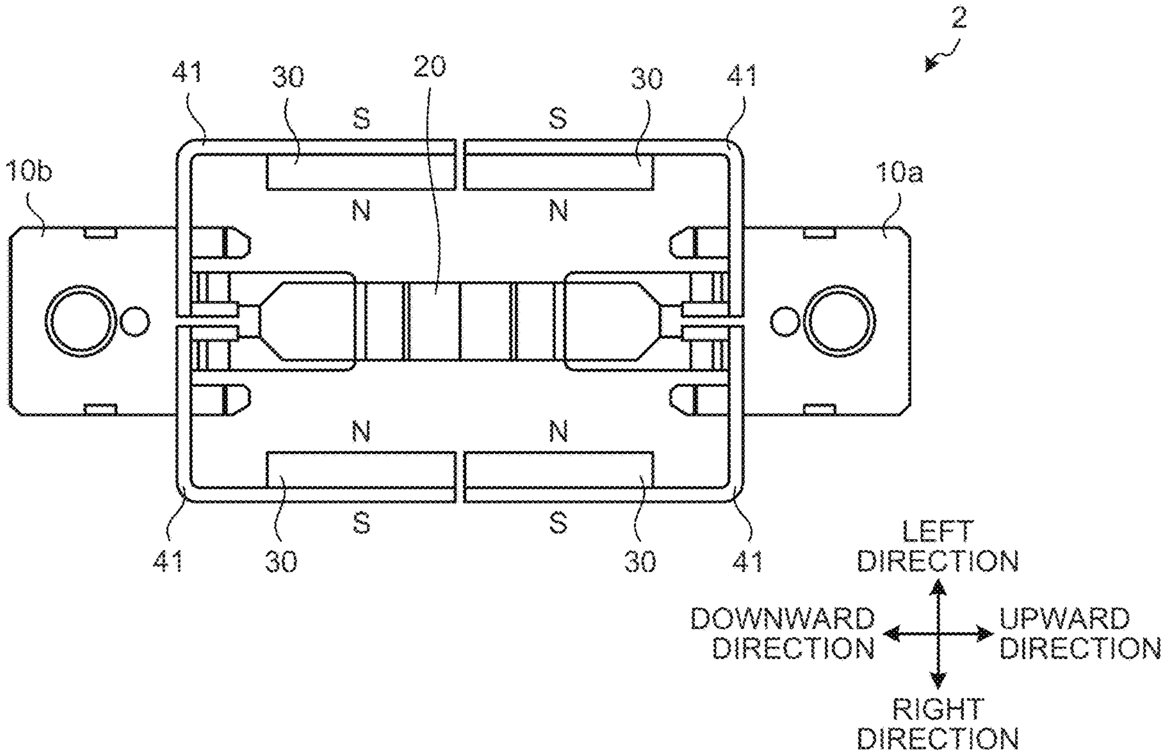
FIG. 5 is a front view illustrating an example of a method of arranging permanent magnets in the switch. according to the first embodiment.
Figure 6:
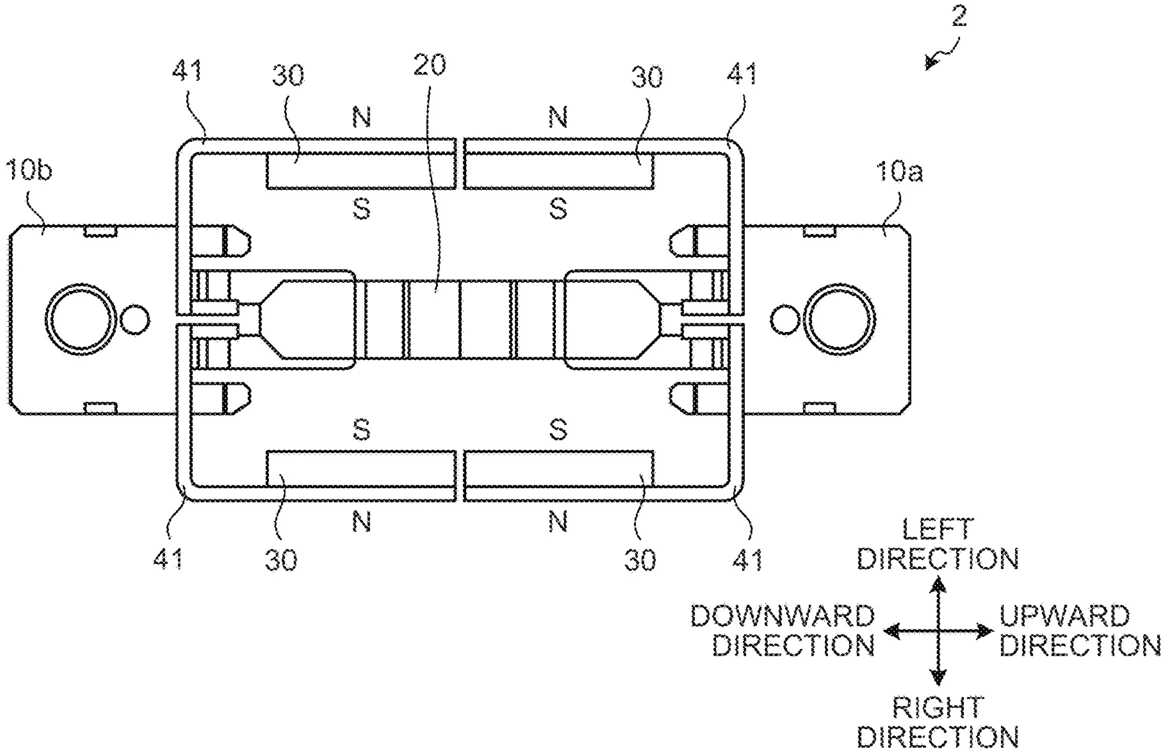
FIG. 6 is a front view illustrating an example of the method of arranging the permanent magnets in the switch. according to the first embodiment.
Figure 7:
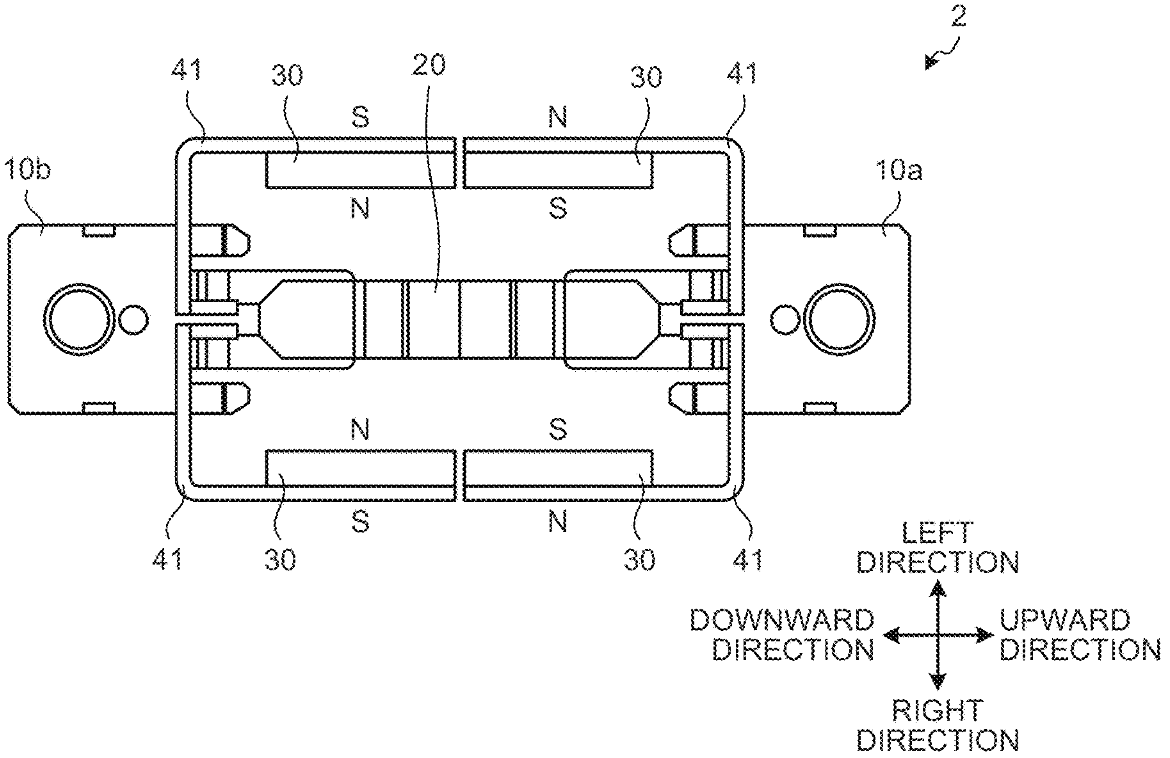
FIG. 7 is a front view illustrating an example of the method of arranging the permanent magnets in the switch according to the first embodiment.
Figure 8:
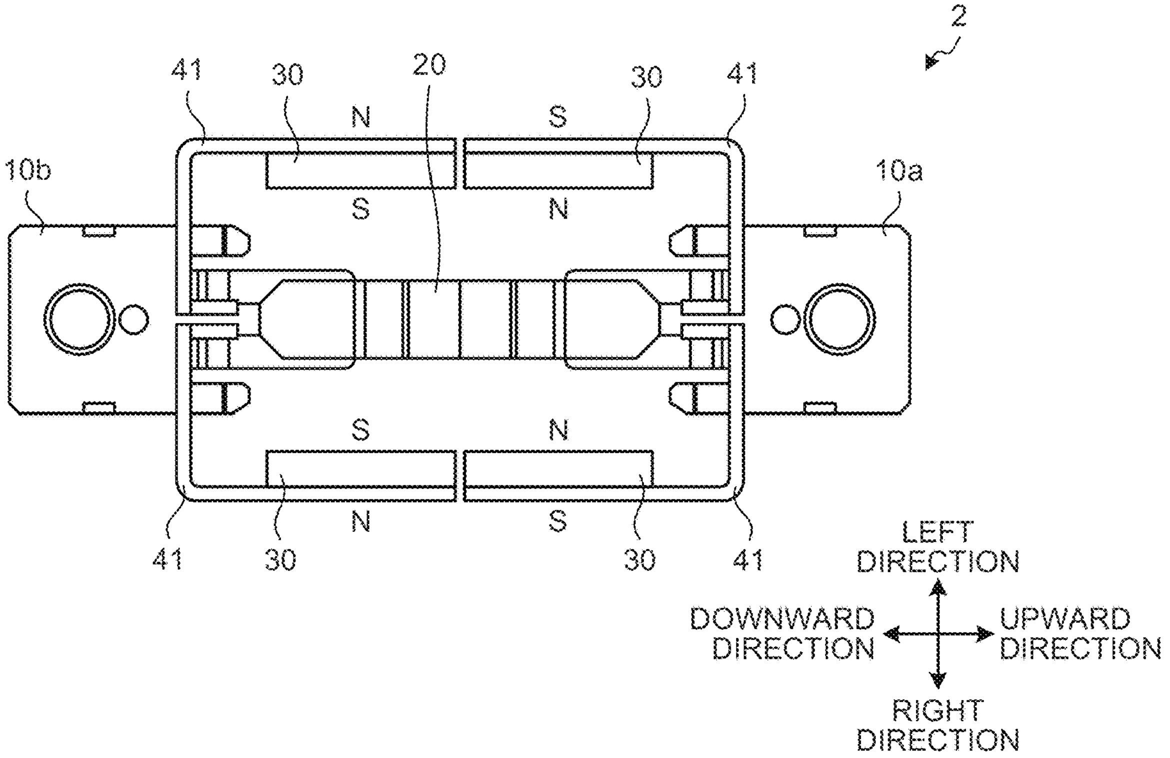
FIG. 8 is a front view illustrating an example of the method of arranging the permanent magnets in the switch according to the first embodiment.

FIGS. 5 to 8 each are a front view illustrating an example of a method of arranging the permanent magnets in the switch according to the first embodiment. In FIG. 5, the permanent magnets 30 are arranged in such a manner that the surfaces of all the permanent magnets 30 on the movable contactor 20 side have N-poles. In FIG. 6, the permanent magnets 30 are arranged in such a manner that the surfaces of all the permanent magnets 30 on the movable contactor 20 side have S-poles. In FIG. 7, the permanent magnets 30 are arranged in such a manner that the surfaces of the pair of the permanent magnets 30 arranged in the upward direction on the movable contactor 20 side have S-poles, and the surfaces of the pair of the permanent magnets 30 arranged in the downward direction on the movable contactor 20 side have N-poles. In FIG. 8, the permanent magnets 30 are arranged in such a manner that the surfaces of the pair of the permanent magnets 30 arranged in the upward direction on the movable contactor 20 side have N-poles, and the surfaces of the pair of the permanent magnets 30 arranged in the downward direction on the movable contactor 20 side have S-poles. As described above, in the permanent magnets 30 arranged to face each other in the left-right direction, their surfaces facing each other have the same polarity.

Returning to FIGS. 2 to 4, the magnetic yoke 40 is connected to other surfaces of the permanent magnets 30 on opposite sides of the surfaces on the movable contactor 20 side. The magnetic yoke 40 is a yoke made of a magnetic material. In the first embodiment, the magnetic yoke 40 is configured with four L-shaped members 41. Each L-shaped member 41 is constructed of a plate-shaped member that extends in the up-down direction in a form along the movable contactor 20 and is bent in an L-shape to the left-right direction side at an end portion of the movable contactor 20 in the up-down direction. That is, the L-shaped member 41 has a configuration in which a first component 411 having a plate shape extending in the up-down direction and a second component 412 having a plate shape extending in the left-right direction are connected together in an L-shaped form. The sizes of the L-shaped members 41 in the front-rear direction are constant. When viewed in the front-rear direction, peripheries of the movable contactor 20 in the up-down direction and the left-right direction are surrounded in a rectangular shape by the four L-shaped members 41. A protrusion 42 protruding toward the movable contactor 20 side is provided at an end portion of the L-shaped member 41 on the second component 412 side. The protrusion 42 is provided at substantially the same position as a position of the movable contactor 20 in the front-rear direction in a state where the movable contacts 21*a* and 21*b* are not in contact with the fixed contacts 11*a* and 11*b*. Examples of the magnetic yoke 40 include soft iron, permalloy, and a silicon steel plate.

Although not illustrated, the arc-extinguishing chamber 2 of the switch 1 has a drive unit that moves the movable contactor 20 in the front-rear direction. The movable contactor 20 is moved in a direction from the movable contacts 21*a* and 21*b* toward the fixed contacts 11*a* and 11*b* by the drive unit. That is, the movable contactor 20 is configured to be able to come into contact with and separate from the fixed contactors 10*a* and 10*b* in the front-rear direction. By the movable contacts 21*a* and 21*b* being in contact with the fixed contacts 11*a* and 11*b* between ones facing each other, an electric current can flow between a wiring line connected to the terminal 12*a* of the first fixed contactor 10*a* and a wiring line connected to the terminal 12*b* of the second fixed contactor 10*b*. In addition, by the movable contacts 21*a* and 21*b* being out of contact with, that is, separating from the fixed contacts 11*a* and 11*b* between ones facing each other, the current can be interrupted between the wiring line connected to the terminal 12*a* of the first fixed contactor 10*a* and the wiring line connected to the terminal 12*b* of the second fixed contactor 10*b*. From a state where the movable contacts 21*a* and 21*b* are in contact with the fixed contacts 11*a* and 11*b* between ones facing each other and an electric current flows therebetween, when the facing ones are separated from each other, high-temperature arc discharge occurs between the movable contacts 21*a* and 21*b* and the fixed contacts 11*a* and 11*b* depending on circuit conditions. Since the arc discharge has electrical conductivity and thereby an electric current flow can be made, a circuit current can be shut off by interrupting the arc discharge. In order to improve performance of the switch 1, it is necessary to interrupt the arc discharge as quickly as possible. One effective means for interrupting the arc discharge is a method of extending and attenuating the arc discharge by electromagnetic force.

Figure 9:
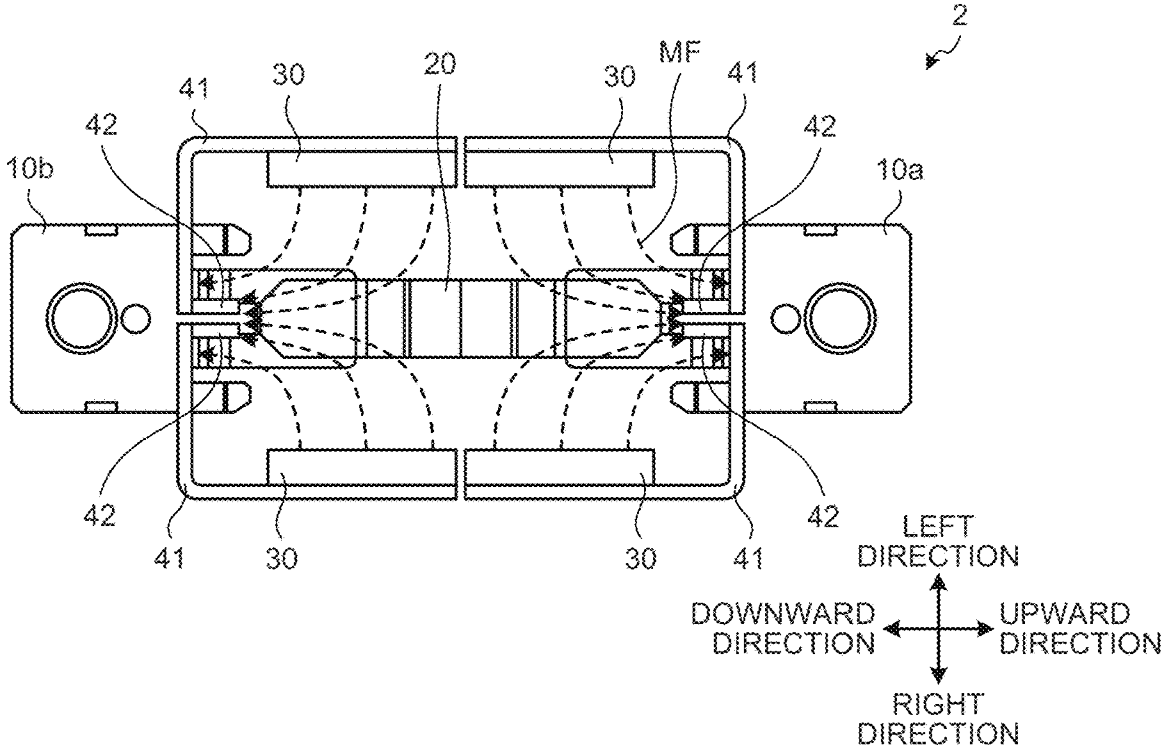
FIG. 9 a front view illustrating an example of a magnetic field distribution of the switch according to the first embodiment.

FIG. 9 is a front view illustrating an example of a magnetic field distribution of the switch according to the first embodiment. As an example of the arrangement of the permanent magnets, a case is assumed where the permanent magnets 30 are arranged in such a manner that all the surfaces of the permanent magnets 30 on the movable contactor 20 side have N-poles, which is illustrated in FIG. 5. Due to the arrangement of the permanent magnets 30 according to the first embodiment, a magnetic field in a direction along the movable contactor 20 is formed. FIG. 9 illustrates magnetic field lines MF formed by this magnetic field. The magnetic field formed is symmetrical in the left-right direction with respect to the movable contactor 20. In addition, since the protrusion 42 of the L-shaped member 41 protrudes toward the end portion of the movable contactor 20 in the up-down direction, magnetic flux densities at positions of the movable contacts 21*a* and 21*b* and the fixed contacts 11*a* and 11*b* are increased. As a result, driving force for the arc discharge is increased at the positions of the movable contacts 21*a* and 21*b* and the fixed contacts 11*a* and 11*b*.

Figure 10:
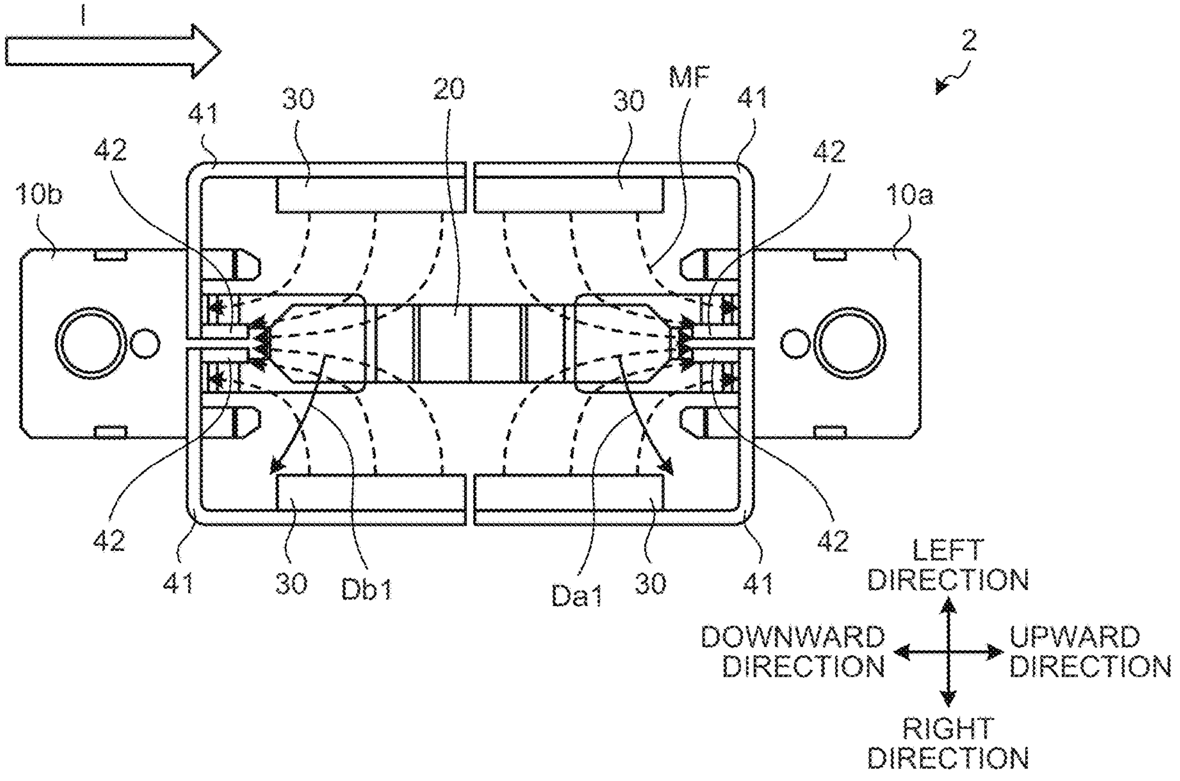
FIG. 10 is a diagram illustrating an example of a driving direction of arc discharge when a movable contact and a fixed contact are separated from each other in the switch according to the first embodiment.
Figure 11:
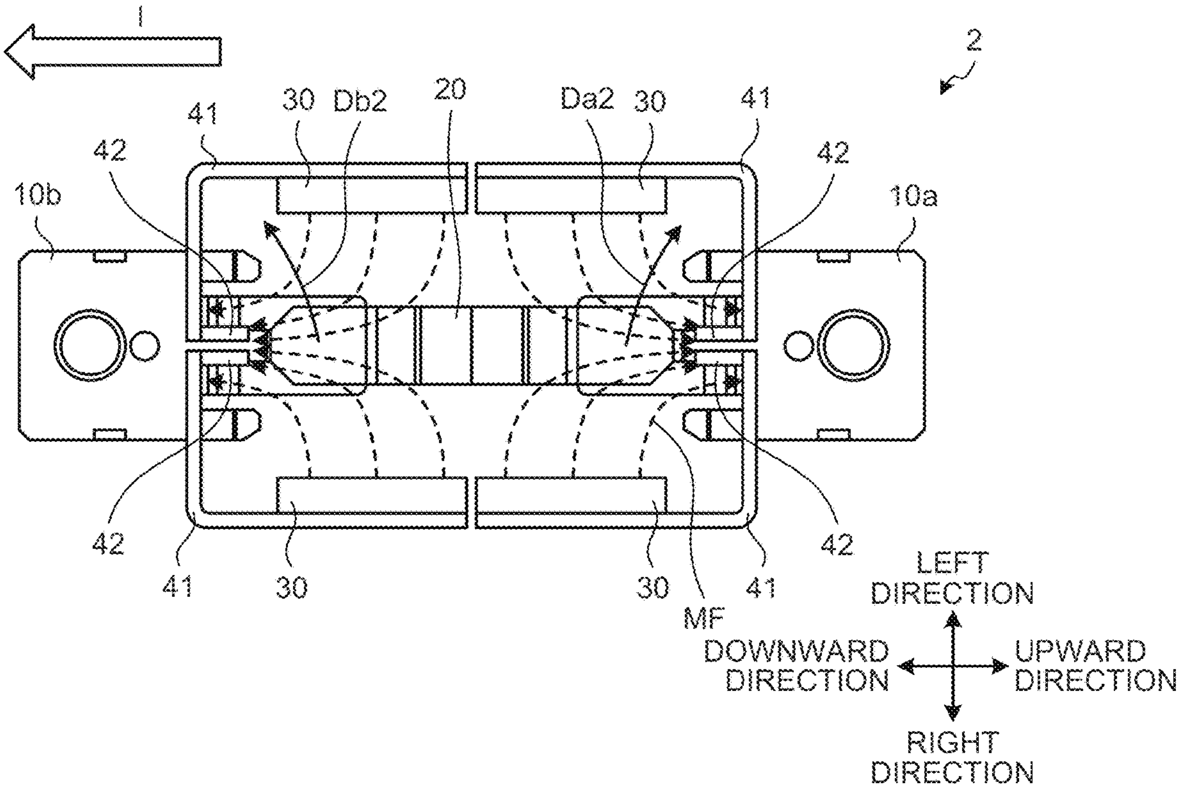
FIG. 11 is a diagram illustrating an example of the driving direction of arc discharge when a movable contact and a fixed contact are separated from each other in the switch according to the first embodiment.

FIGS. 10 and 11 are diagrams illustrating an example of driving directions of arc discharge when the movable contact and the fixed contact are separated from each other in the switch according to the first embodiment. FIG. 10 illustrates an example of a driving direction of the arc discharge when an electric current I flows through the movable contactor 20 from the lower side toward the upper side. In this case, the arc discharge is driven in directions of Da1 and Db1. FIG. 11 illustrates an example of a driving direction of the arc discharge when an electric current I flows through the movable contactor 20 from the upper side toward the lower side. In this case, the arc discharge is driven in directions of Da2 and Db2. As described above, regardless of the direction of the current I flowing through the movable contactor 20, the arc discharge caused between the movable contacts 21*a* and 21*b* and the fixed contacts 11*a* and 11*b* can be extended longer by the electromagnetic force, and high current interruption performance can be achieved. In particular, since the magnetic flux densities in predetermined ranges covering the movable contacts 21*a* and 21*b* and the fixed contacts 11*a* and 11*b* can be increased by the protrusions 42 of the L-shaped members 41, a high driving force to the arc discharge can be realized immediately after a start of the current interruption.

In the first embodiment, the switch 1 includes: the first fixed contactor 10*a* including the first fixed contact 11*a;* the second fixed contactor 10*b* including the second fixed contact 11*b* disposed on an extension line in an extending direction of the first fixed contactor 10*a;* and the movable contactor 20 including the first movable contact 21*a* and the second movable contact 21*b*. The movable contactor 20 is movable in a direction in which the first movable contact 21*a* and the second movable contact 21*b* come into contact with or separate from the first fixed contact 11*a* and the second fixed contact 11*b*. The permanent magnets 30 are arranged in a direction perpendicular to an extending direction and a moving direction of the movable contactor 20 in such a manner that the surfaces facing each other have the same polarity with the movable contactor 20 interposed therebetween. The movable contactor 20 is surrounded in a rectangular form by the magnetic yoke 40 consisting of the four L-shaped members 41 each having one end disposed on a permanent magnet 30 side, and the other end disposed on an end portion side of the movable contactor 20 in the extending direction of the contactor. Then, the L-shaped member 41 includes the protrusion 42 protruding toward an end portion of the movable contactor 20, on the end portion side of the movable contactor 20 in the extending direction thereof. By this configuration, the magnetic field in the direction along the movable contactor 20 is generated, and the magnetic flux densities in the predetermined ranges covering the movable contacts 21*a* and 21*b* and the fixed contacts 11*a* and 11*b* are increased. As a result, from immediately after the start of current interruption in the case where the movable contacts 21*a* and 21*b* and the fixed contacts 11*a* and 11*b* are separated from each other from their contact state, a higher driving force to the arc discharge can be achieved than in the conventional technique. As a result, it is possible to obtain a higher interruption performance for the arc discharge than in the conventional technique regardless of the energization direction of the current flowing through the movable contactor 20.

Second Embodiment

Figure 12:
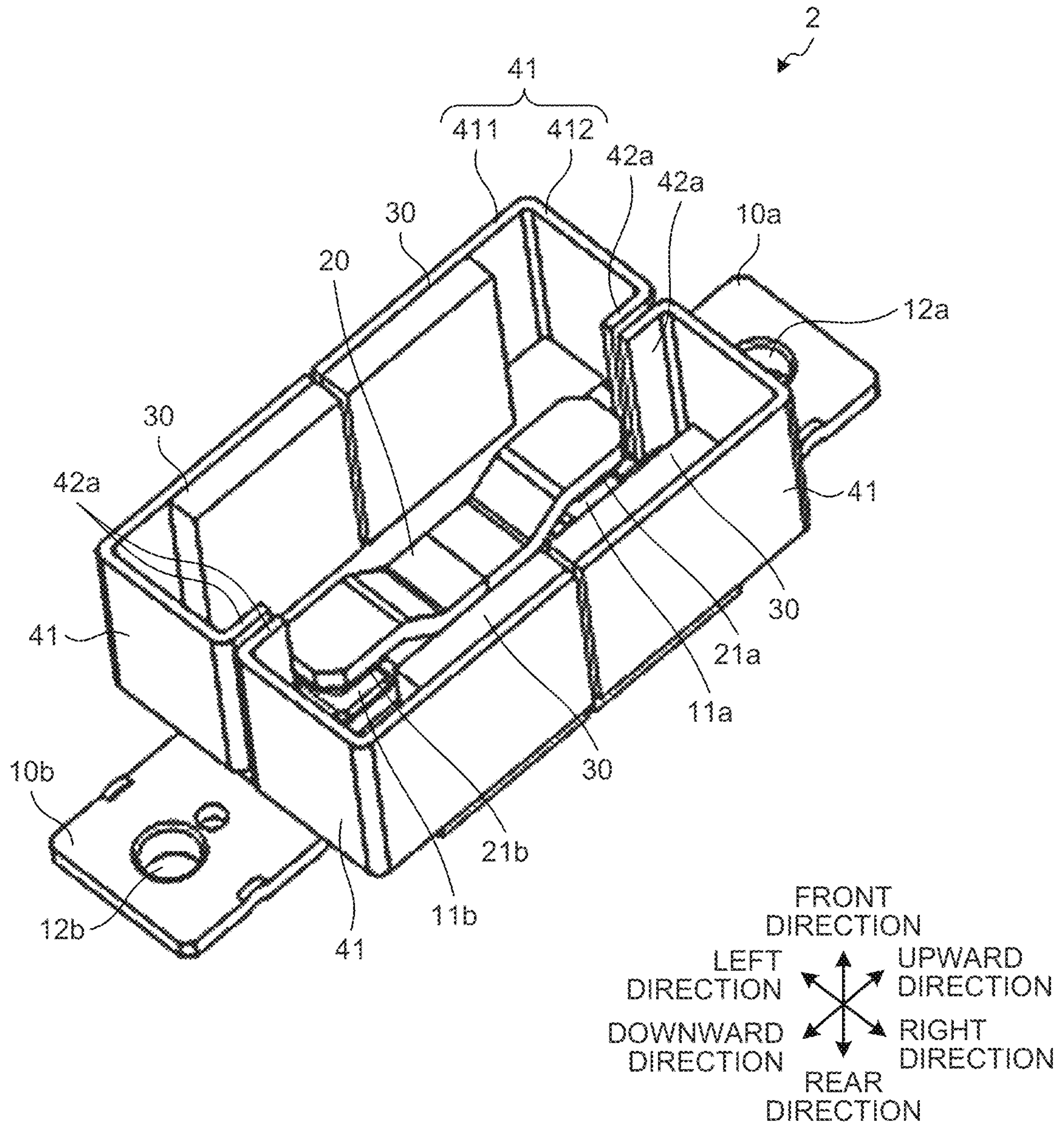
FIG. 12 a perspective view illustrating an example of an internal configuration of an arc-extinguishing chamber of a switch according to a second embodiment.
Figure 13:
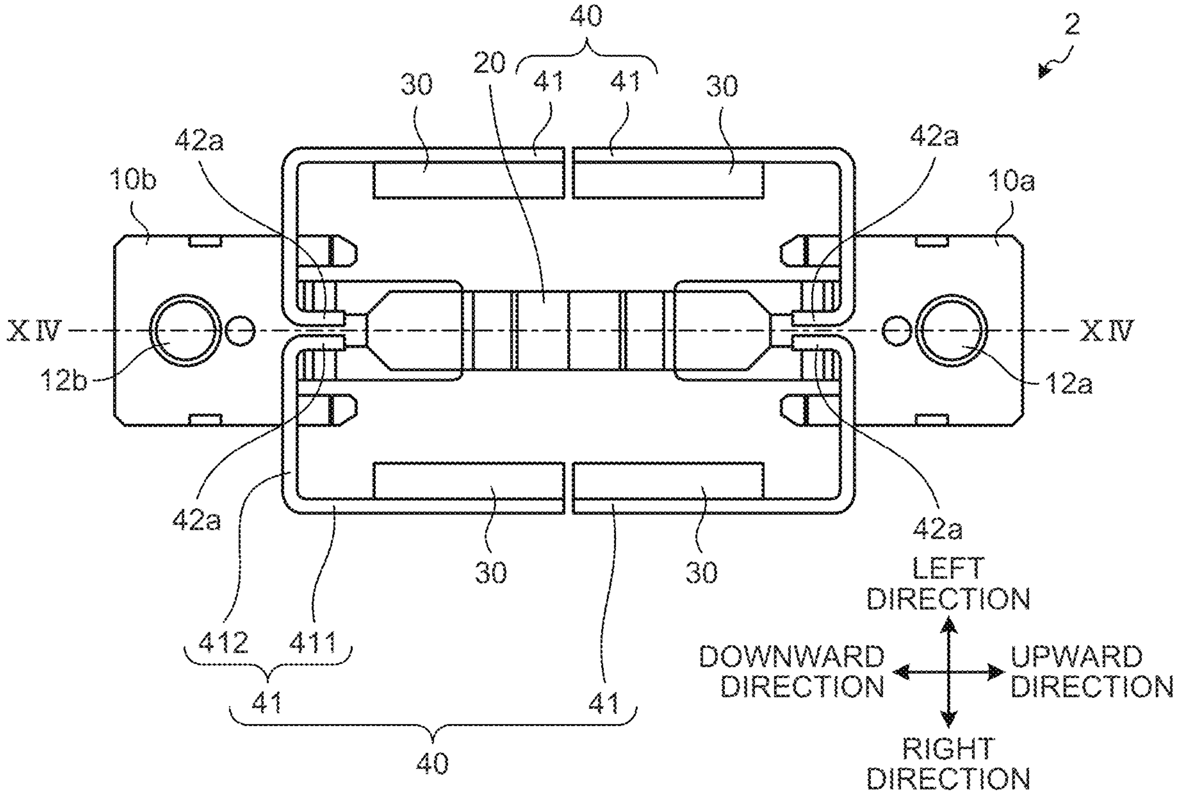
FIG. 13 is a front view illustrating the example of the internal configuration of the arc-extinguishing chamber of the switch according to the second embodiment.
Figure 14:
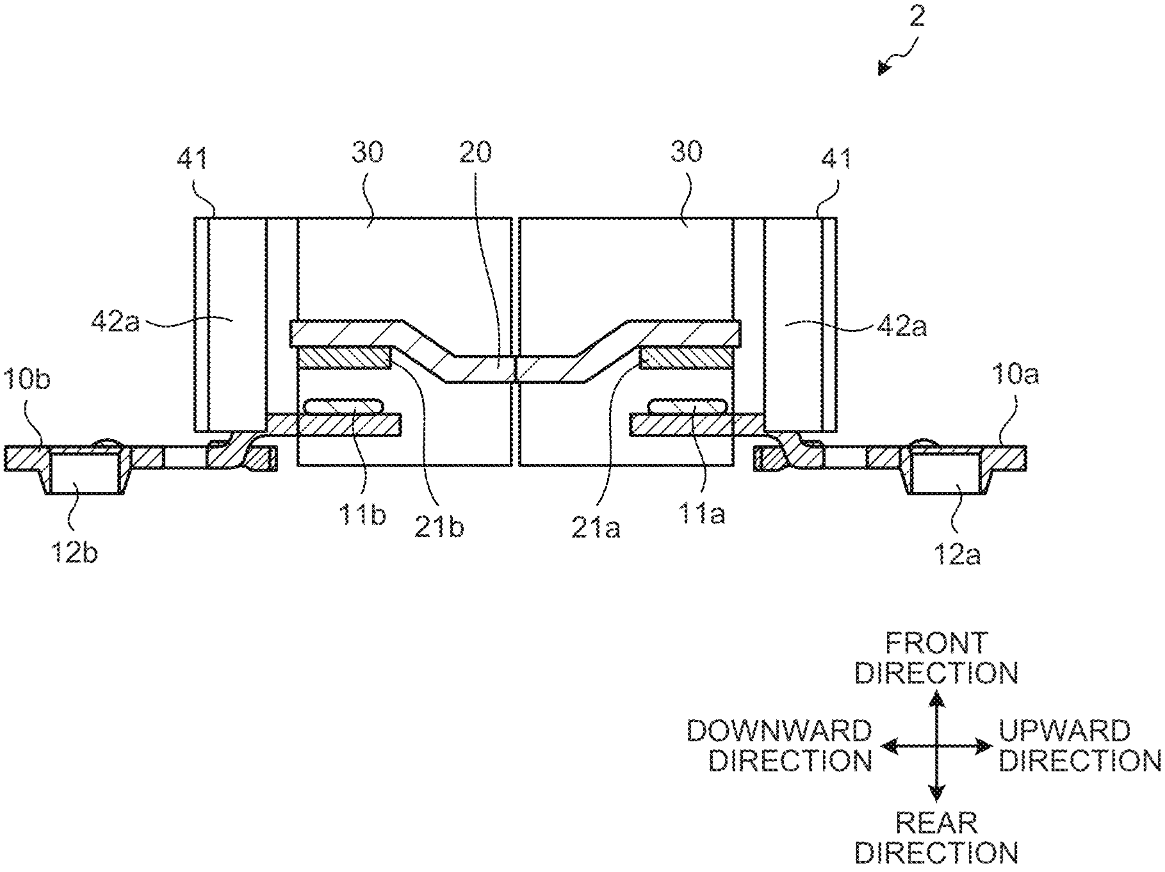
FIG. 14 is a cross-sectional view taken along a line XIV-XIV of FIG. 13.

FIG. 12 is a perspective view illustrating an example of an internal configuration of an arc-extinguishing chamber of a switch according to a second embodiment, FIG. 13 is a front view illustrating the example of the internal configuration of the arc-extinguishing chamber of the switch according to the second embodiment, and FIG. 14 is a cross-sectional view taken along a line XIV-XIV of FIG. 13. Note that, in the following, differences from the first embodiment will be mainly described, and the same components as those in the first embodiment will be denoted by the same reference symbols, and description thereof will be omitted.

In the first embodiment, the protrusion 42 is provided at substantially the same position as the position of the end portion of the L-shaped member 41 on the second component 412 side in the front-rear direction of the movable contactor 20, but in the second embodiment, a protrusion 42*a* provided at the end portion of the L-shaped member 41 on the second component 412 side has the same size in the front-rear direction as the other portions of the L-shaped member 41. In an example, such an L-shaped member 41 is formed by bending an end portion on the second component 412 side toward the movable contactor 20 side.

Also in the second embodiment, it is possible to form a magnetic field that is symmetrical in the left-right direction with respect to the movable contactor 20, and is in a direction along the movable contactor 20. In addition, due to the protrusion 42*a* provided at the end portion of the L-shaped member 41 on the second component 412 side, the magnetic flux densities in the predetermined ranges covering the movable contacts 21*a* and 21*b* and the fixed contacts 11*a* and 11*b* are increased. As a result, similarly to the first embodiment, high arc interruption performance can be achieved regardless of the direction of the current flowing through the movable contactor 20. In addition, in the second embodiment, the protrusion 42*a* can be formed by bending a portion of the L-shaped member 41 on the second component 412 side toward the movable contactor 20 side. That is, since the magnetic yoke 40 and the protrusion 42*a* can be easily manufactured as one component, a manufacturing cost can be reduced.

Third Embodiment

Figure 15:
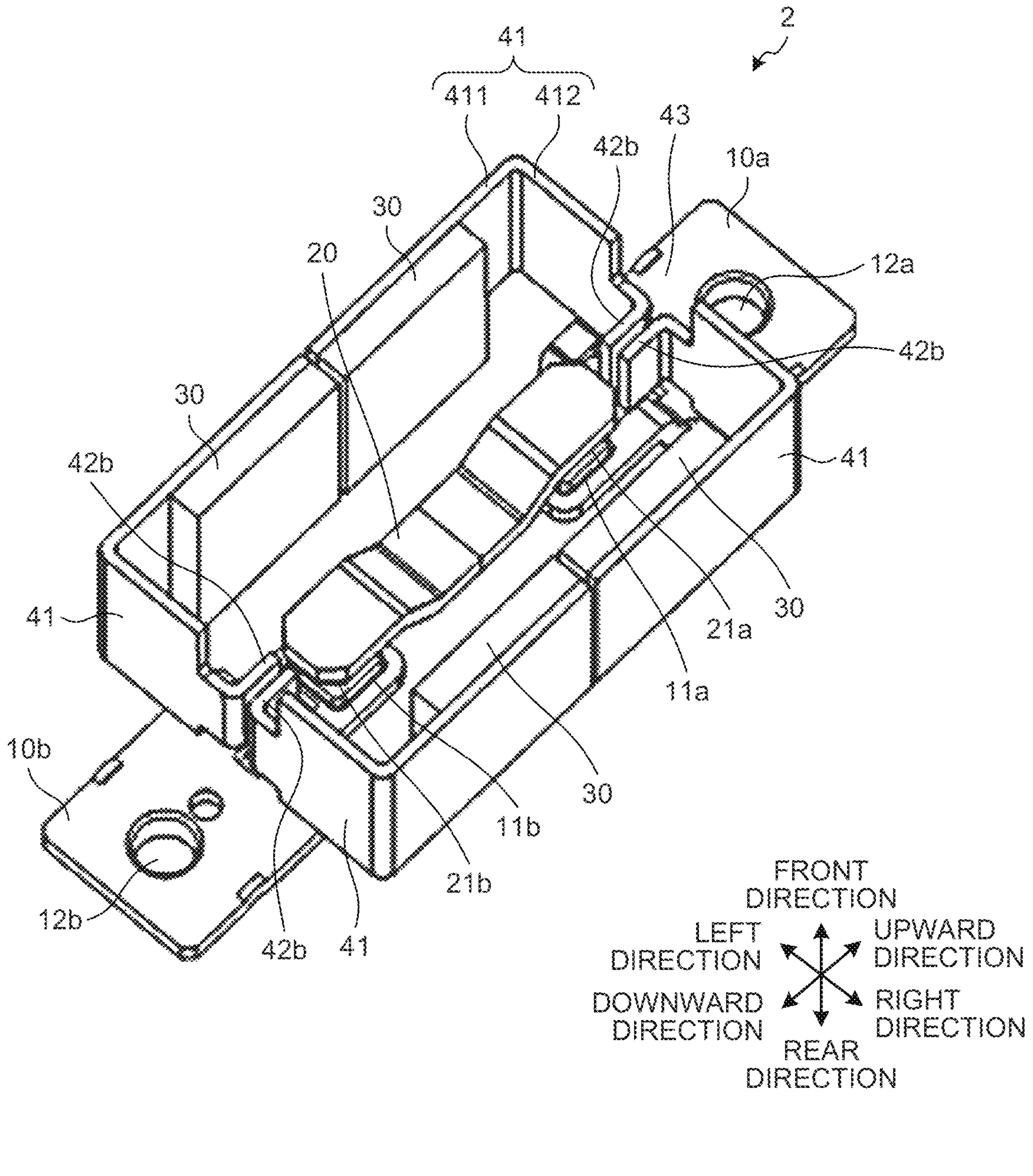
FIG. 15 is a perspective view illustrating an example of an internal configuration of an arc-extinguishing chamber of a switch according to a third embodiment.
Figure 16:
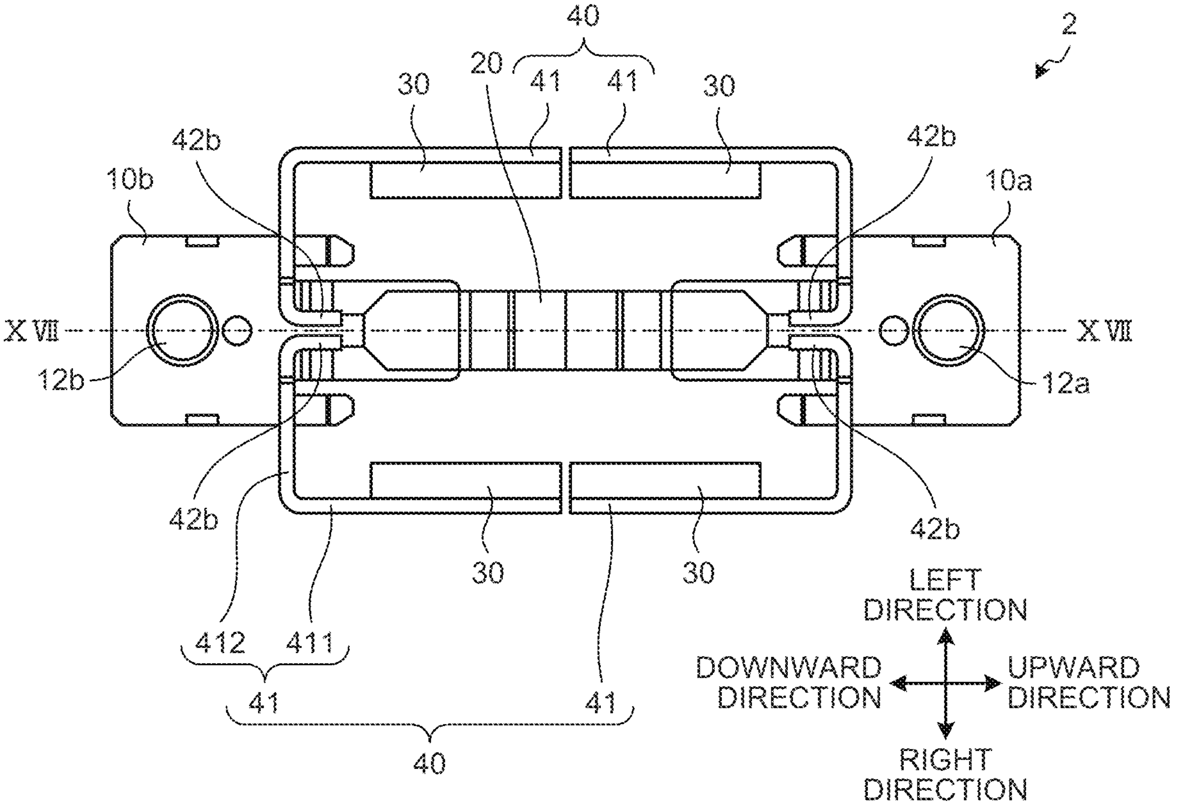
FIG. 16 is a front view illustrating the example of the internal configuration of the arc-extinguishing chamber of the switch according to the third embodiment.
Figure 17:
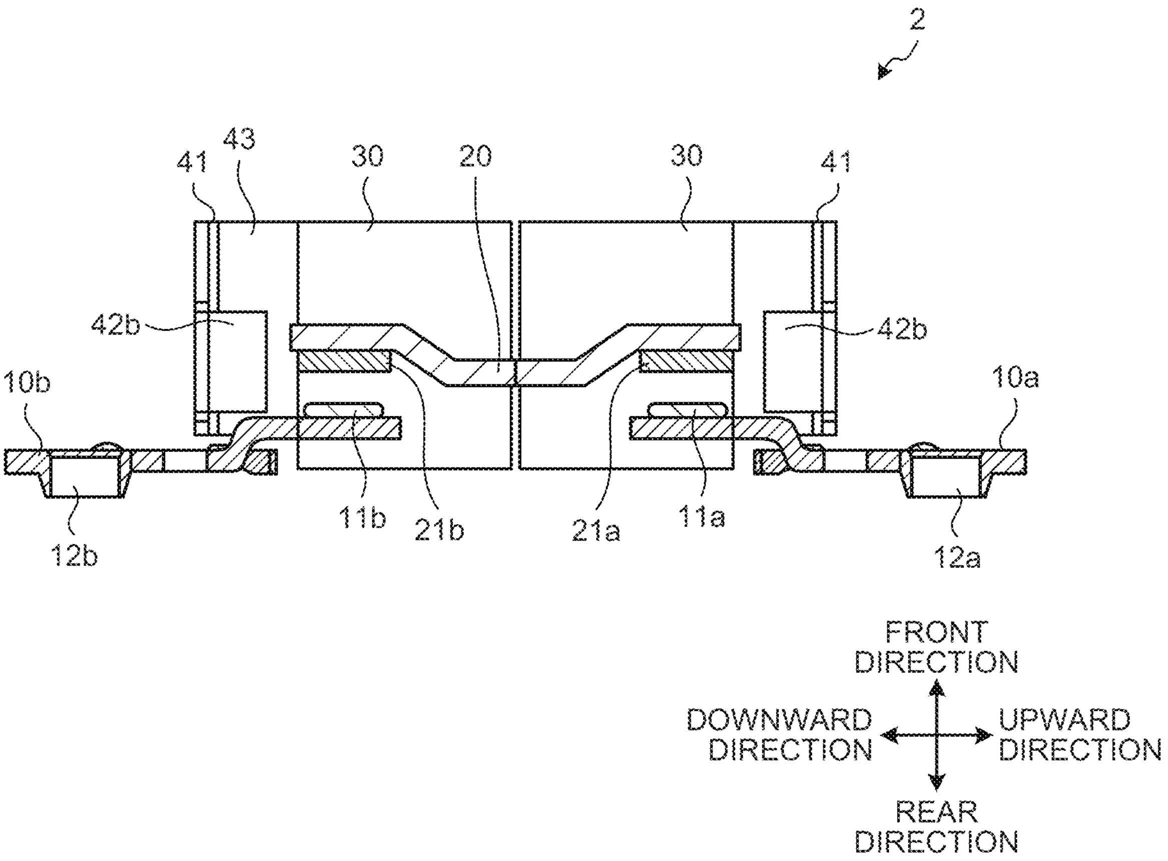
FIG. 17 is a cross-sectional view taken along a line XVII-XVII of FIG. 16.

FIG. 15 is a perspective view illustrating an example of an internal configuration of an arc-extinguishing chamber of a switch according to a third embodiment, FIG. 16 is a front view illustrating the example of the internal configuration of the arc-extinguishing chamber of the switch according to the third embodiment, and FIG. 17 is a cross-sectional view taken along a line XVII-XVII of FIG. 16. Note that, in the following, differences from the first and second embodiments will be mainly described, and the same components as those in the first and second embodiments will be denoted by the same reference symbols, and description thereof will be omitted.

In the third embodiment, a notch 43 is provided in a part of a protrusion 42*b* formed by bending at the end portion of the L-shaped member 41 on the second component 412 side. In this example, a part removed from the protrusion 42*a* on the front side is the notch 43 in the second embodiment, and the remaining protrusion 42*a* on the rear side is the protrusion 42*b* according to the third embodiment. The protrusion 42*b* is formed from the upper part of the fixed contactor 10*a* or 10*b* to substantially the same position as the position of the movable contactor 20 in the front-rear direction in the state where the movable contacts 21*a* and 21*b* are not in contact with the fixed contacts 11*a* and 11*b*. As a result, the magnetic flux densities in the predetermined ranges covering the movable contacts 21*a* and 21*b* and the fixed contacts 11*a* and 11*b* are increased.

In the third embodiment, the notch 43 is provided on the front side in the front-rear direction of the protrusion 42*b* provided at the end portion of the L-shaped member 41 on the second component 412 side, and the protrusion 42*b* is provided in a range in which the movable contacts 21*a* and 21*b* and the fixed contacts 11*a* and 11*b* are located. By so doing, the magnetic flux densities around the movable contacts 21*a* and 21*b* and the fixed contacts 11*a* and 11*b* can be increased as compared with the case of the second embodiment. As a result, as compared with the case of the second embodiment, a driving speed against the arc discharge can be increased, and higher interruption performance against the arc discharge can be obtained. Note that the notch 43 only needs to be provided on either the front side or the rear side in the front-rear direction.

Fourth Embodiment

Figure 18:
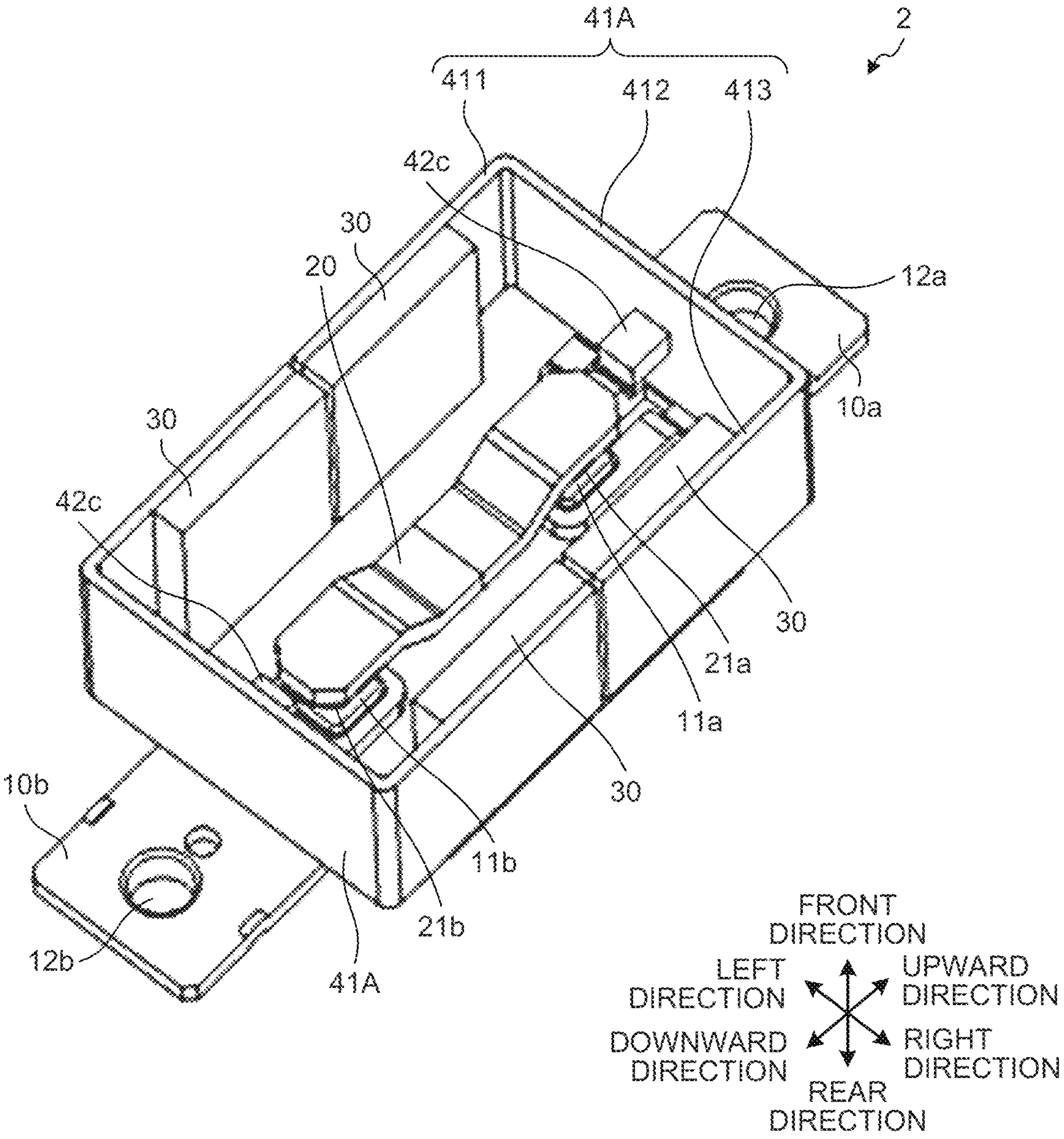
FIG. 18 is a perspective view illustrating an example of an internal configuration of an arc-extinguishing chamber of a switch according to a fourth embodiment.
Figure 19:
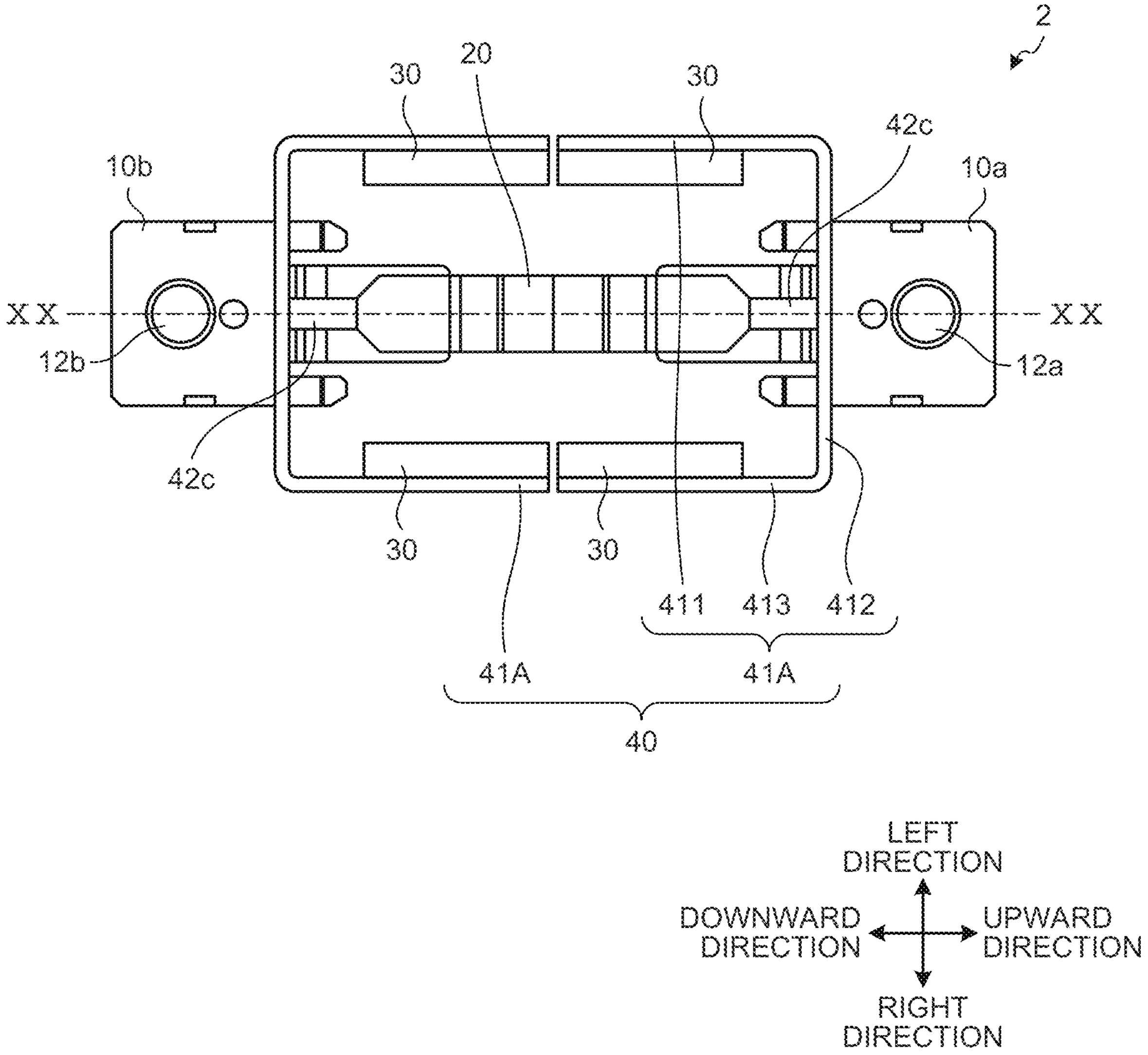
FIG. 19 is a front, view illustrating the example of the internal configuration of the arc-extinguishing chamber of the switch according to the fourth embodiment.
Figure 20:
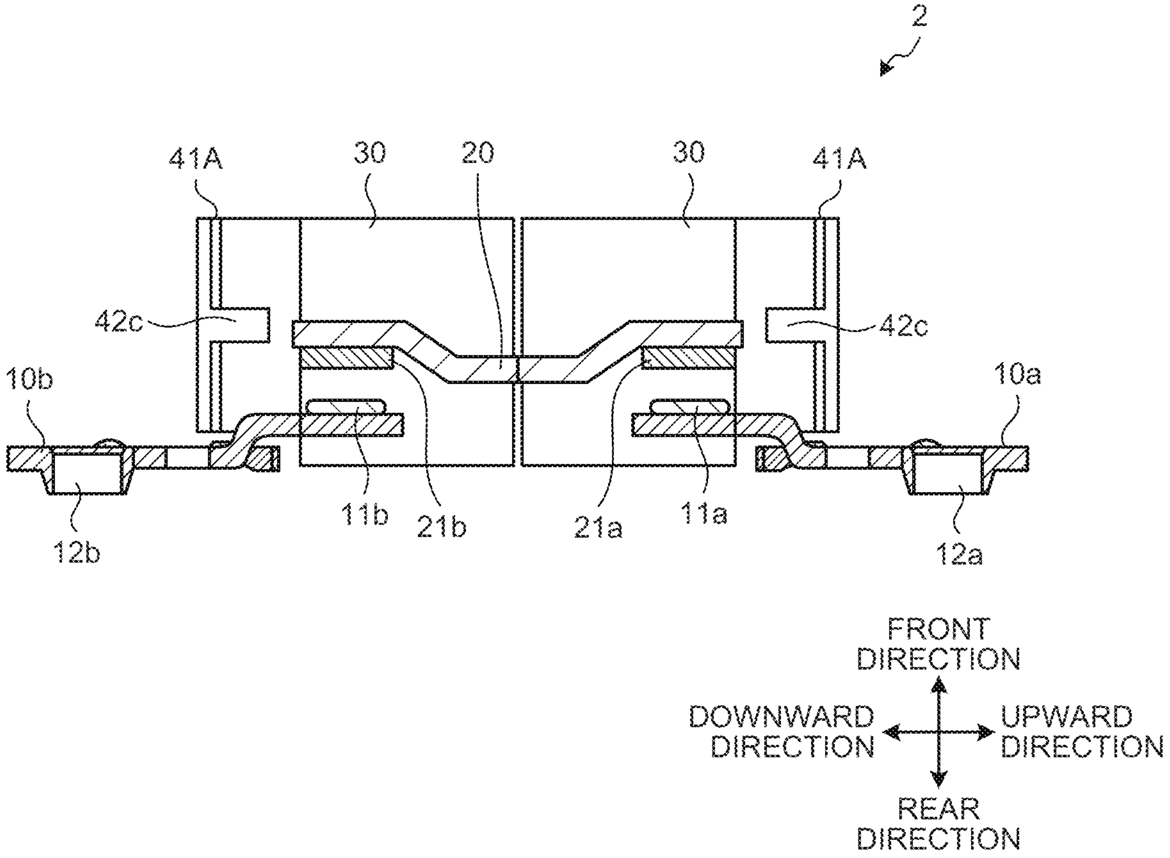
FIG. 20 is a cross-sectional view taken along a line XX-XX of FIG. 19.

FIG. 18 is a perspective view illustrating an example of an internal configuration of an arc-extinguishing chamber of a switch according to a fourth embodiment, FIG. 19 is a front view illustrating the example of the internal configuration of the arc-extinguishing chamber of the switch according to the fourth embodiment, and FIG. 20 is a cross-sectional view taken along a line XX-XX of FIG. 19. Note that, in the following, differences from the first to third embodiments will be mainly described, and the same components as those in the first to third embodiments will be denoted by the same reference symbols, and description thereof will be omitted.

In the fourth embodiment, the magnetic yoke 40 is composed of two U-shaped members 41A. Each U-shaped member 41A includes the first component 411 having a plate shape extending in the up-down direction, the second component 412 having a plate shape extending in the left-right direction, and a third component 413 having a plate shape, which is disposed in parallel with the first component 411 and extends in the up-down direction. End portions of the first component 411 and the third component 413 in the same direction are connected together to make a U shape by the second component 412. The U-shaped member 41A is unified with covering one end portion side of the movable contactor 20 in the up-down direction while being connected to surfaces on opposite sides of surfaces facing the movable contactor 20, of the pair of the permanent magnets 30 arranged in the left-right direction.

In addition, on a surface of the second component 412 on the movable contactor 20 side, a protrusion 42*c* is formed, which protrudes toward the movable contactor 20 side. In this example, similarly to the first embodiment, the protrusion 42*c* is provided at substantially the same position as the position of the movable contactor 20 in the front-rear direction in the state where the movable contacts 21*a* and 21*b* are not in contact with the fixed contacts 11*a* and 11*b*. However, similarly to the second embodiment, the protrusion 42*c* may have the same size as the size of the second component 412 in the front-rear direction, on the surface on the movable contactor 20 side of the second component 412. In addition, similarly to the third embodiment, the notch 43 may be provided in a part of the protrusion 42*c*. As described above, the U-shaped member 41A of the fourth embodiment has a configuration in which two of the L-shaped members 41 of the first to third embodiments are combined and integrally formed. As a result, it becomes possible to surround the periphery of the movable contactor 20 by the two U-shaped members 41A.

In the fourth embodiment, the two U-shaped members 41A are used to surround the periphery of the movable contactor 20 in the up-down direction and the left-right direction. As a result, the number of members constituting the magnetic yoke 40 can be reduced as compared with the cases of the first to third embodiments, and it is possible to obtain an effect that the cost can be reduced in addition to effects of the first to third embodiments.

Fifth Embodiment

Figure 21:
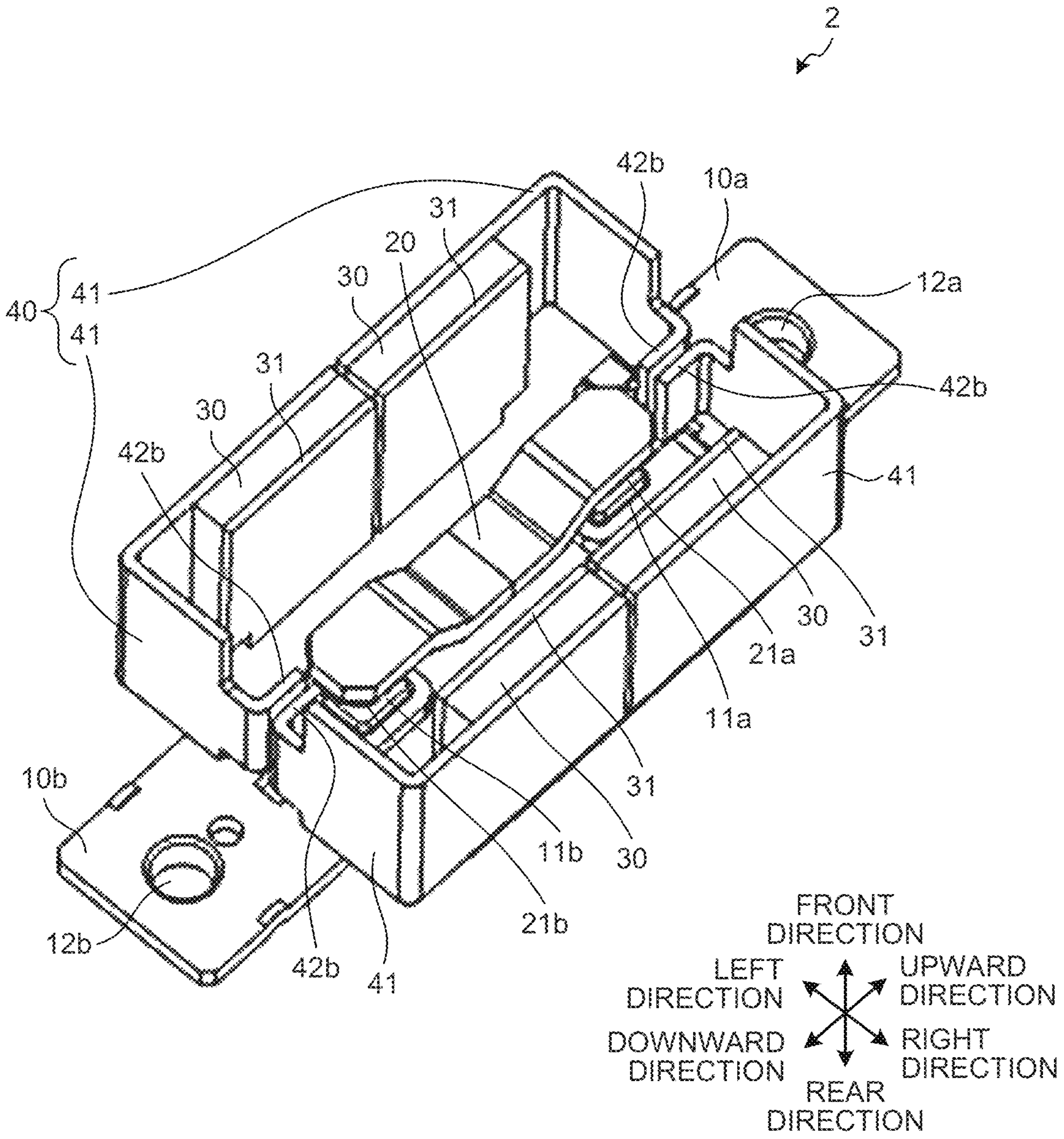
FIG. 21 is a perspective view illustrating an example of an internal configuration of an arc-extinguishing chamber of a switch according to a fifth embodiment.

FIG. 21 is a perspective view illustrating an example of an internal configuration of an arc-extinguishing chamber of a switch according to a fifth embodiment. Note that, in the following, differences from the first to fourth embodiments will be mainly described, and the same components as those in the first to fourth embodiments will be denoted by the same reference symbols, and description thereof will be omitted.

In the fifth embodiment, the switch 1 further includes insulating resin parts 31 on the surfaces of the permanent magnets 30 on the movable contactor 20 side. Note that, although FIG. 21 illustrates a case where the insulating resin part 31 is provided only for the permanent magnet 30, the insulating resin part 31 may be provided to cover the magnetic yoke 40 and the protrusion 42*b* provided on the magnetic yoke 40, not only for the permanent magnet 30.

In addition, although FIG. 21 illustrates a case where the configuration of the fifth embodiment is applied to the arc-extinguishing chamber 2 of the switch 1 of the third embodiment, the configuration of the fifth embodiment may be applied to the arc-extinguishing chambers 2 of the switches 1 of the first, second, and fourth embodiments.

In the fifth embodiment, the insulating resin parts 31 are provided on the surfaces of the permanent magnets 30 on the movable contactor 20 side. The insulating resin parts 31 prevent the arc discharge, which is caused and driven between the movable contacts 21*a* and 21*b* and the fixed contacts 11*a* and 11*b*, from directly coming into contact with the permanent magnets 30. As a result, there is an advantageous effect that it is possible to prevent the permanent magnets 30 from being thermally demagnetized. In addition, in a case where the permanent magnets 30 have electrical conductivity, it is possible to prevent dielectric breakdown caused by contact with the arc discharge by protecting the permanent magnets 30 with the insulating resin parts 31. In addition, the arc discharge extended by the magnetic flux is put against the insulating resin part 31, and thereby leading to an additional effect that higher arc discharge interruption performance can be achieved.

Sixth Embodiment

Figure 22:
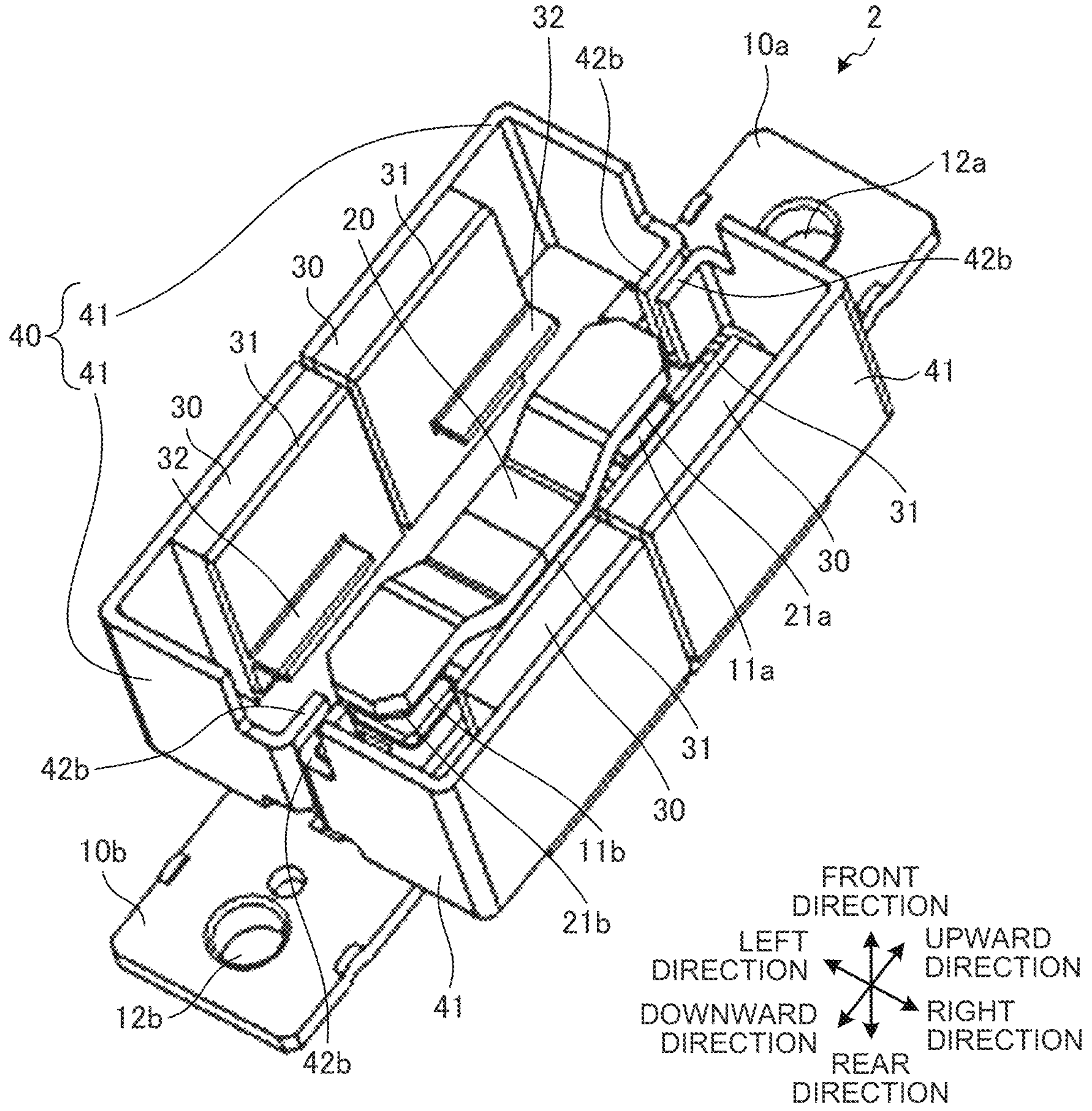
FIG. 22 is a perspective view illustrating an example of an internal configuration of an arc-extinguishing chamber of a switch according to a sixth embodiment.
Figure 23:
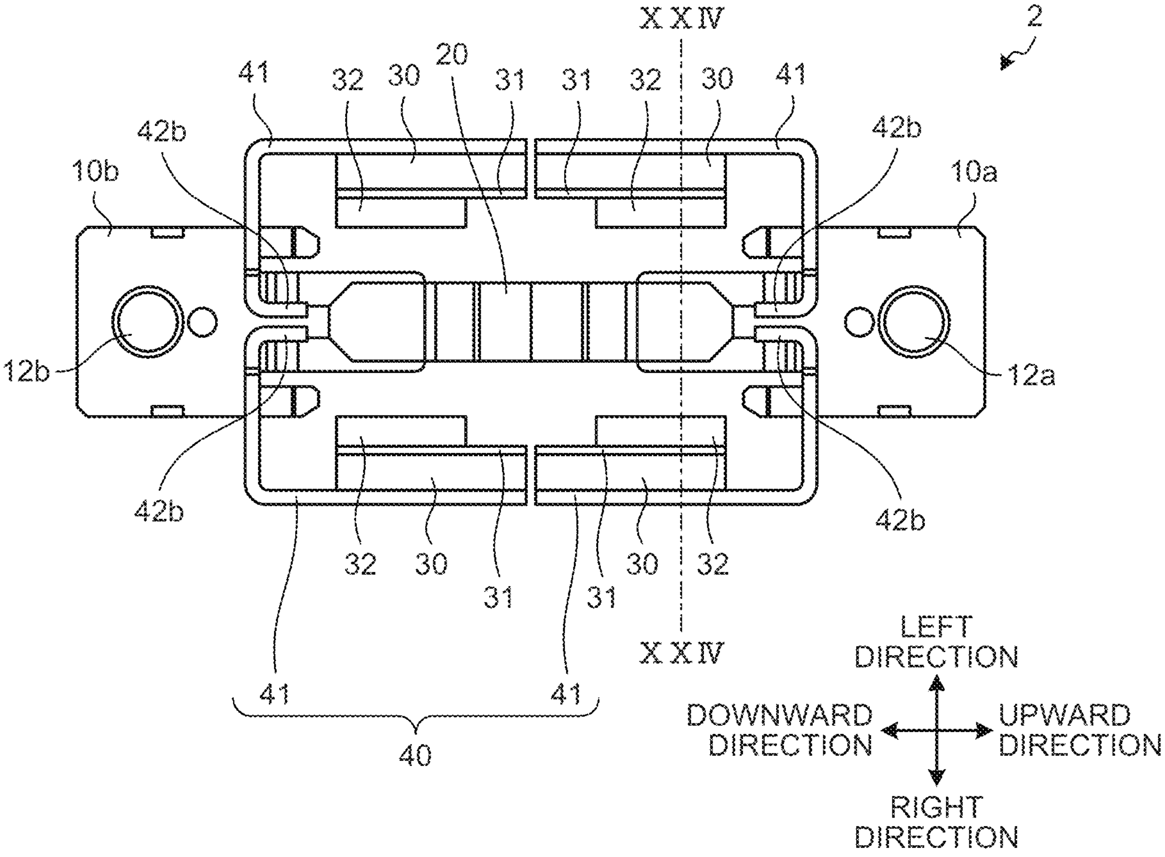
FIG. 23 is a front view illustrating the example of the internal configuration of the arc-extinguishing chamber of the switch according to the sixth embodiment.
Figure 24:
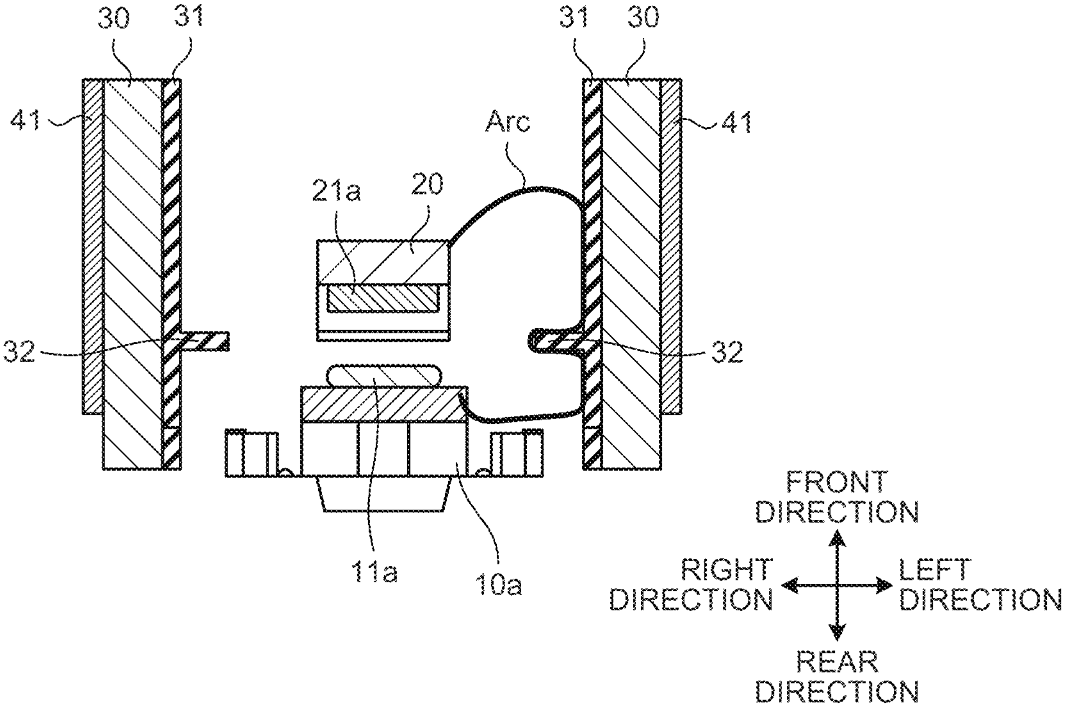
FIG. 24 is a cross-sectional view taken along a line XXIV-XXIV of FIG. 23.

FIG. 22 is a perspective view illustrating an example of an internal configuration of an arc-extinguishing chamber of a switch according to a sixth embodiment, FIG. 23 is a front view illustrating the example of the internal configuration of the arc-extinguishing chamber of the switch according to the sixth embodiment, and FIG. 24 is a cross-sectional view taken along a line XXIV-XXIV of FIG. 23. FIG. 24 illustrates how the arc discharge is driven. Note that, in the following, differences from the first to fifth embodiments will be mainly described, and the same components as those in the first to fifth embodiments will be denoted by the same reference symbols, and description thereof will be omitted.

The switch 1 of the sixth embodiment further includes a convex portion 32 of the insulating resin part 31 extending in the up-down direction in the configuration of the fifth embodiment. The convex portion 32 is formed on the movable contactor 20 side of the insulating resin part 31. The convex portion 32 is desirably provided at a position between the movable contactor 20 and the fixed contactors 10*a* and 10*b* in the state where the movable contacts 21*a* and 21*b* are not in contact with the fixed contacts 11*a* and 11*b*. As illustrated in FIG. 24, when arc discharge Arc which is caused and driven between the movable contacts 21*a* and 21*b* and the fixed contacts 11*a* and 11*b* is driven toward the permanent magnet 30 side, the arc discharge Arc is stretched by the convex portion 32 of the insulating resin part 31. As a result, the interruption performance against the arc discharge Arc can be further improved as compared with the case of the fifth embodiment.

Note that, although the insulating resin part 31 including the convex portion 32 is provided only for the permanent magnet 30 in this example, the insulating resin parts 31 including the convex portion 32 may be provided to cover the magnetic yoke 40 and the protrusion 42*b* provided on the magnetic yoke 40, not only for the permanent magnet 30. In addition, in this example, a case has been described where one convex portion 32 is provided in the front-rear direction, but two or more convex portions 32 may be provided in the front-rear direction.

Further, although FIGS. 22 to 24 illustrate a case where the configuration of the sixth embodiment is applied to the arc-extinguishing chamber 2 of the switch 1 of the third embodiment, the configuration of the sixth embodiment may be applied to the arc-extinguishing chambers 2 of the switches 1 of the first, second, and fourth embodiments.

In the sixth embodiment, the insulating resin part 31 having the convex portion 32 longitudinally extending in the up-down direction is provided on the surface of the permanent magnets 30 on the movable contactor 20 side. As a result, the arc discharge Arc which is caused and to be driven between the movable contacts 21*a* and 21*b* and the fixed contacts 11*a* and 11*b* is put against the convex portion 32, so that the arc can be stretched longer, and higher arc interruption performance can be obtained than in the cases of the first to fifth embodiments.

Note that, in the first to sixth embodiments described above, cases have been described where the two pairs of the permanent magnets 30 are arranged in the up-down direction with the movable contactor 20 interposed therebetween, but a similar effect can be exerted even in a case where one pair of the permanent magnets 30 are arranged with the movable contactor 20 interposed therebetween.

Seventh Embodiment

Figure 25:
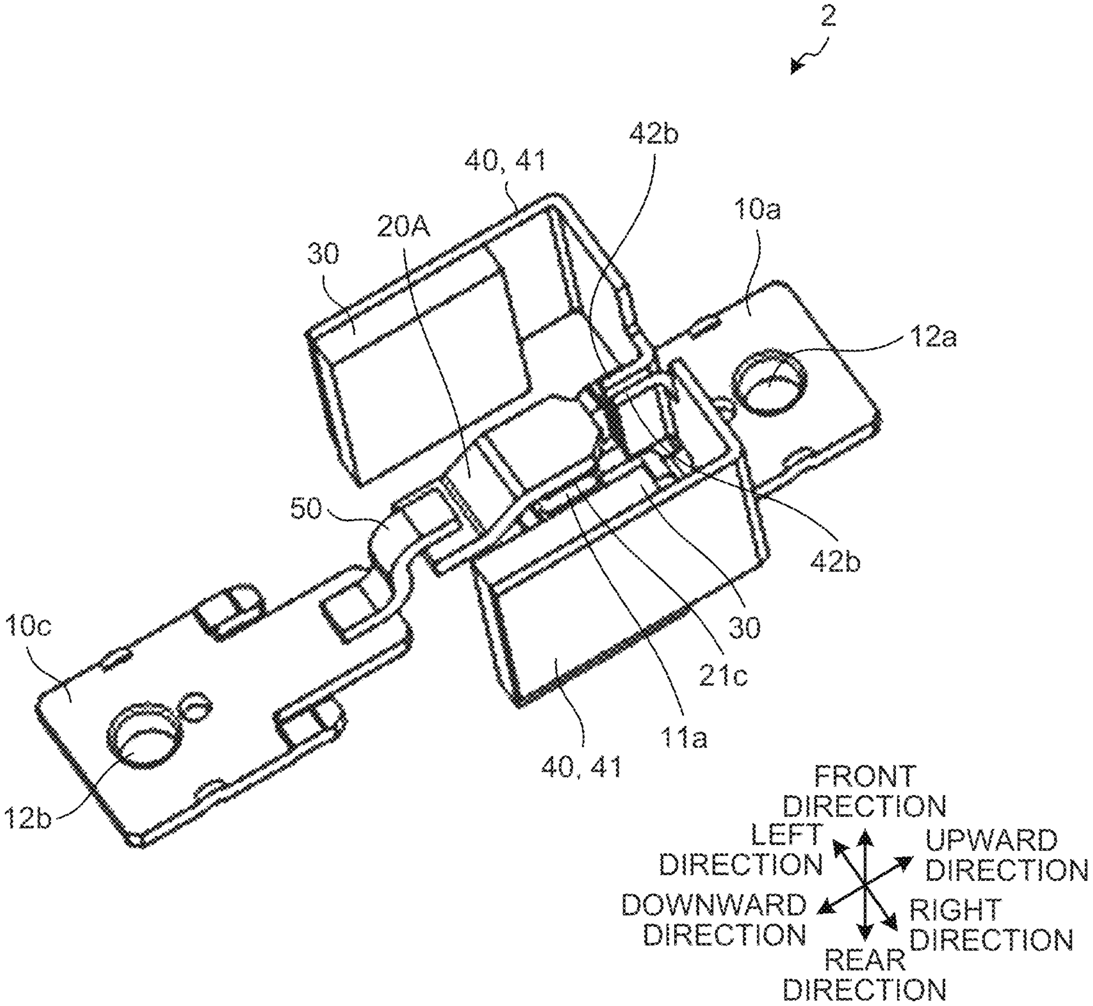
FIG. 25 is a perspective view illustrating an example of an internal configuration of an arc-extinguishing chamber of a switch according to a seventh embodiment.

FIG. 25 is a perspective view illustrating an example of an internal configuration of an arc-extinguishing chamber of a switch according to a seventh embodiment. Note that, in the following, differences from the first to sixth embodiments will be mainly described, and the same components as those in the first to sixth embodiments will be denoted by the same reference symbols, and description thereof will be omitted.

The switch 1 includes the first fixed contactor 10*a*, a second fixed contactor 10*c*, a movable contactor 20A, the permanent magnets 30, and the magnetic yoke 40. The first fixed contactor 10*a* is similar to that described in the first embodiment.

The second fixed contactor 10*c* is made of a plate-shaped member having a rectangular shape when viewed in the front-rear direction. The second fixed contactor 10*c* has the terminal 12*b* at one end portion in the extending direction thereof and a flexible conductor 50 that is an electric conductor having flexibility at the other end portion. The flexible conductor 50 is made of a soft conductor having flexibility such as a flat braided wire, an electrically conductive thin plate having flexibility, or the like. Similarly to the first embodiment, the first fixed contactor 10*a* and the second fixed contactor 10*c* are arranged on one and the same straight line extending in the up-down direction.

The movable contactor 20A is formed of a plate-shaped member that extends in a direction along the up-down direction in which the first fixed contactor 10*a* and the second fixed contactor 10*c* are aligned, and has a uniform thickness in the front-rear direction. The movable contactor 20A has a step structure at a central portion thereof in the up-down direction. The movable contactor 20A has a movable contact 21*c* having a plate shape at an end portion that is a first end portion on the first fixed contactor 10*a* side. In addition, the movable contactor 20A is supported by the second fixed contactor 10*c* via the flexible conductor 50 at an end portion that is a second end portion on the second fixed contactor 10*c* side. That is, in the seventh embodiment, the movable contactor 20A and the second fixed contactor 10*c* have a configuration in which they are electrically connected together by the flexible conductor 50. Note that, as long as the movable contactor 20A can be moved while maintaining electrical conduction with the second fixed contactor 10*c,* the movable contactor 20A and the second fixed contactor 10*c* may be brought into contact with each other with a certain degree of freedom instead of using the flexible conductor 50. The movable contactor 20A is moved in a contactable and separatable manner in the front-rear direction by a drive unit (not illustrated). As a result, the movable contact 21*c* and the first fixed contact 11*a* come into contact with or separate from each other.

The permanent magnets 30 are arranged in the left-right direction of the movable contactor 20A with the movable contactor 20A interposed therebetween. In this example, the pair of the permanent magnets 30 are arranged in such a manner that the surfaces thereof on the movable contactor 20A side have the same polarity.

The magnetic yoke 40 is provided to surround locations with the movable contactor 20A interposed therebetween in the left-right direction and a side in the up-down direction on which the movable contact 21*c* of the movable contactor 20A is disposed. In a case where the L-shaped member 41 described in the first, second, third, fifth, and sixth embodiments is used, the magnetic yoke 40 is composed of two L-shaped members 41. Alternatively, in a case where the U-shaped member 41A described in the fourth embodiment is used, the magnetic yoke 40 is composed of one U-shaped member 41A. In either case, in the magnetic yoke 40, a periphery of the movable contactor 20A in the directions except for the front-rear direction and the downward direction is surrounded. In the example of FIG. 25, a case is illustrated where the magnetic yoke 40 is composed of the two L-shaped members 41. The protrusion 42*b* protruding toward the movable contact 21*c* is provided at a position facing the movable contact 21*c* of the L-shaped member 41.

Note that, in the example of FIG. 25, a case is illustrated where the protrusion 42*b* described in the third embodiment is provided, but any of the protrusions 42, 42*a,* and 42*c* described in the first, third, and fourth embodiments may be provided instead thereof. In addition, the insulating resin part 31 described in the fifth embodiment or the insulating resin part 31 having the convex portion 32 described in the sixth embodiment may be provided on a surface of the permanent magnets 30 on the movable contactor 20A side.

Even with the above configuration, as described in the first to sixth embodiments, a significantly high driving force can be generated for the arc discharge Arc caused at the moment when the movable contact 21*c* and the first fixed contact 11*a* are separated from each other.

The switch 1 of the seventh embodiment includes the first fixed contactor 10*a* including the first fixed contact 11*a,* the movable contactor 20A including the movable contact 21*c* at one end in association with the first fixed contact 11*a,* and the second fixed contactor 10*c* supporting the other end portion of the movable contactor 20A with the flexible conductor 50. Then, the switch 1 includes the permanent magnets 30 situated in the left-right direction with respect to the movable contactor 20A, and includes the magnetic yoke 40 to cover surfaces of the permanent magnets 30 on opposite sides of the movable contactor 20A side, and the side in the up-down direction on which the movable contact 21*c* is disposed. The protrusion 42*b* is provided at a position facing the movable contact 21*c* of the magnetic yoke 40. With such a configuration, the number of patterns of the arc discharge Arc each of which runs in series can be reduced by half as compared with the first to sixth embodiments. In addition, as compared with the first to sixth embodiments, in association with the situation where the second fixed contact 11*b* and the second movable contact 21*b* are not provided, the number of components can be reduced, while the contact portions connected in series are reduced by half, so that it is possible to obtain an effect that contact resistance can be reduced in addition to effects of the first to sixth embodiments.

Eighth Embodiment

Figure 26:
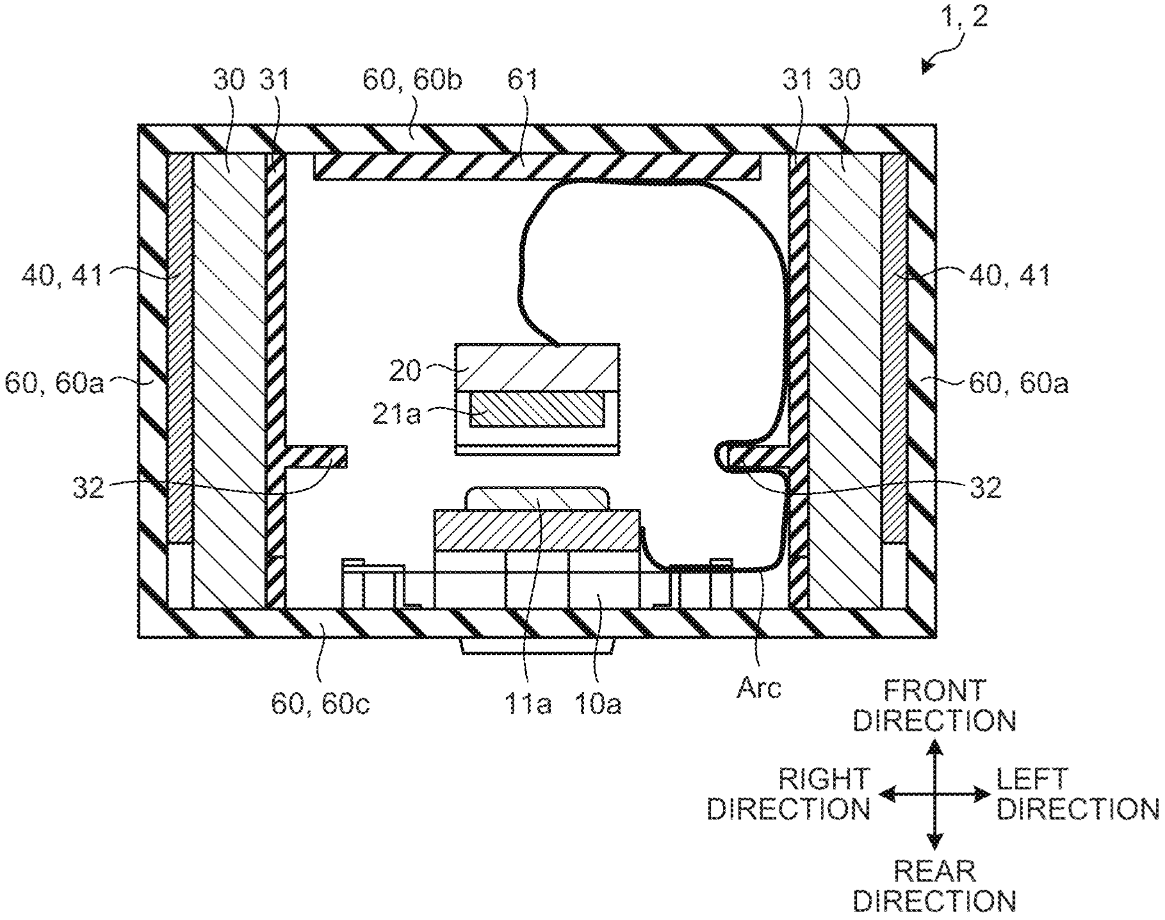
FIG. 26 is a cross-sectional view illustrating an example of an internal configuration of an arc-extinguishing chamber of a switch according to an eighth embodiment.

FIG. 26 is a cross-sectional view illustrating an example of an internal configuration of an arc-extinguishing chamber of a switch according to an eighth embodiment. FIG. 26 corresponds to, for example, the cross-sectional view taken along a line XXIV-XXIV in FIG. 23 of the sixth embodiment. Note that, in the following, differences from the first to seventh embodiments will be mainly described, and the same components as those in the first to seventh embodiments will be denoted by the same reference symbols, and description thereof will be omitted.

In FIG. 26, in description of the configuration of the eighth embodiment, for the sake of convenience, the cover 60 that covers each arc-extinguishing chamber 2 is illustrated with respect to the switch 1, but the shape is not limited to the illustrated shape. The cover 60 covers, in the up-down direction, the front-rear direction, and the left-right direction, a space in which the movable contactor 20, the pair of the permanent magnets 30, and the magnetic yoke 40 are disposed. In an example, the cover 60 is provided to cover an outer peripheral surface of the magnetic yoke 40 and front and rear surfaces of a space surrounded by the magnetic yoke 40. That is, the cover 60 has a side surface 60*a* perpendicular to the left-right direction, a side surface perpendicular to the up-down direction, a front surface 60*b* perpendicular to the frontward direction, and a rear surface 60*c* perpendicular to the rearward direction. The first fixed contactor 10*a* and the second fixed contactor 10*b* are fixed to the rear surface 60*c* of the cover 60.

The switch 1 of the eighth embodiment further includes a resin plate 61 installed at a position on an opposite side of the movable contacts 21*a* and 21*b* with respect to the movable contactor 20 with keeping an interval from the movable contactor 20 and being in parallel with the movable contactor 20. In an example, the resin plate 61 is a plate-shaped member formed of a thermally decomposable polymer material, and is fixed to the front surface 60*b* of the cover 60. Alternatively, the resin plate 61 may be formed integrally with the front surface 60*b* of the cover 60. When the arc discharge Arc comes into contact with the resin plate 61, decomposition gas is generated from the resin plate 61 by heat of the arc discharge Arc or the like. Then, the arc discharge Arc is cooled by the decomposition gas.

In addition, since a space between the movable contactor 20 and the resin plate 61 is an arc extension space that is a space for extending the arc discharge Arc, it is desirable that the resin plate 61 is made as thin as possible so that the arc extension space is sufficiently secured. Note that FIG. 26 illustrates an example of an arc form when the arc discharge Arc is extended to the arc extension space.

Note that, in the above description, a case has been described where the resin plate 61 is provided in the configuration of the sixth embodiment, but the resin plate 61 may be similarly provided in the configurations of the first to fifth embodiments and the seventh embodiment.

In the eighth embodiment, the resin plate 61 is set in the arc extension space on an opposite side of the movable contact 21*a* with respect to the movable contactor 20. As a result, when the arc discharge Arc is extended, the arc discharge Arc comes into contact with the resin plate 61, and when the arc discharge Arc comes into contact with the resin plate 61, the decomposition gas is generated from the resin plate 61 by an action such as heat of the arc discharge Arc. Then, it is possible to obtain an effect that the arc discharge Arc is cooled by the decomposition gas of the resin plate 61 and performance of interrupting the arc discharge Arc can be improved in addition to effects of the first to seventh embodiments.

Ninth Embodiment

Figure 27:
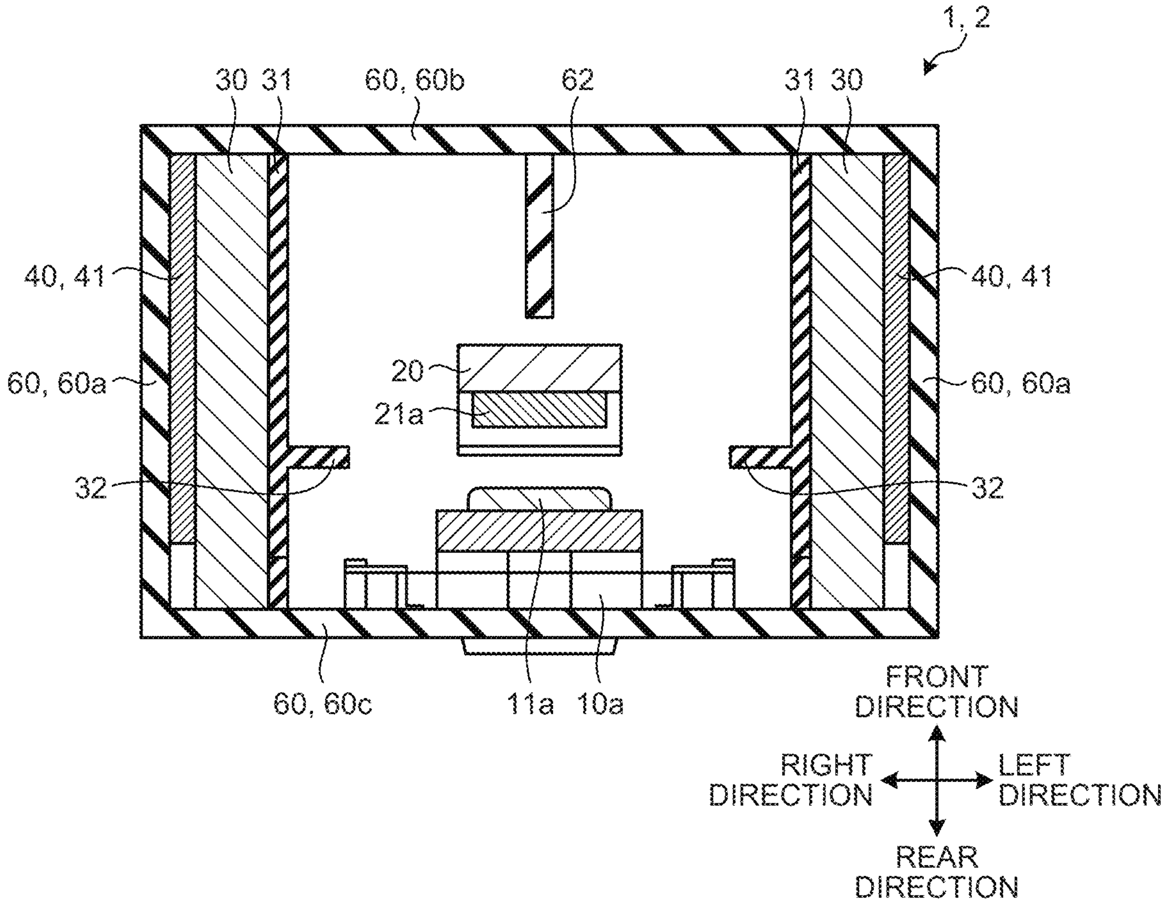
FIG. 27 is a cross-sectional view illustrating an example of an internal configuration of an arc-extinguishing chamber of a switch according to a ninth embodiment.

FIG. 27 is a cross-sectional view illustrating an example of an internal configuration of an arc-extinguishing chamber of a switch according to a ninth embodiment. FIG. 27 corresponds to, for example, the cross-sectional view taken along a line XXIV-XXIV in FIG. 23 of the sixth embodiment. Note that, in the following, differences from the first to eighth embodiments will be mainly described, and the same components as those in the first to eighth embodiments will be denoted by the same reference symbols, and description thereof will be omitted.

The switch 1 of the ninth embodiment further includes an insulating plate 62 having a plate shape extending in the front-rear direction and the up-down direction. The insulating plate 62 is disposed at an interval from the movable contactor 20 at a position on an opposite side of the movable contacts 21*a* and 21*b* with respect to the movable contactor 20 in such a manner that an extending direction of the insulating plate 62 is along a longitudinal direction of the movable contactor 20. Specifically, the insulating plate 62 is set at a predetermined interval from the movable contactor 20 in such a manner that the extending direction of the insulating plate 62 is parallel to the longitudinal direction of the movable contactor 20 at a central portion of the movable contactor 20 in the left-right direction. In the example of FIG. 27, the insulating plate 62 is disposed along the longitudinal direction of the movable contactor 20 in a posture substantially perpendicular to the front surface of the movable contactor 20. In an example, the insulating plate 62 is formed of an insulating resin such as polyamide, or an insulating resin containing a flame retardant. The thickness in the left-right direction of the insulating plate 62 is, for example, in a range of greater than or equal to 1 mm and less than or equal to 2 mm. The insulating plate 62 is fixed to, for example, the front surface 60*b* of the cover 60. Alternatively, the insulating plate 62 may be integrally formed of the same material as the front surface 60*b* of the cover 60.

Note that, in the above description, a case has been described where the insulating plate 62 is provided in the configuration of the sixth embodiment, but the insulating plate 62 may be similarly provided in the configurations of the first to fifth embodiments and the seventh embodiment.

Figure 28:
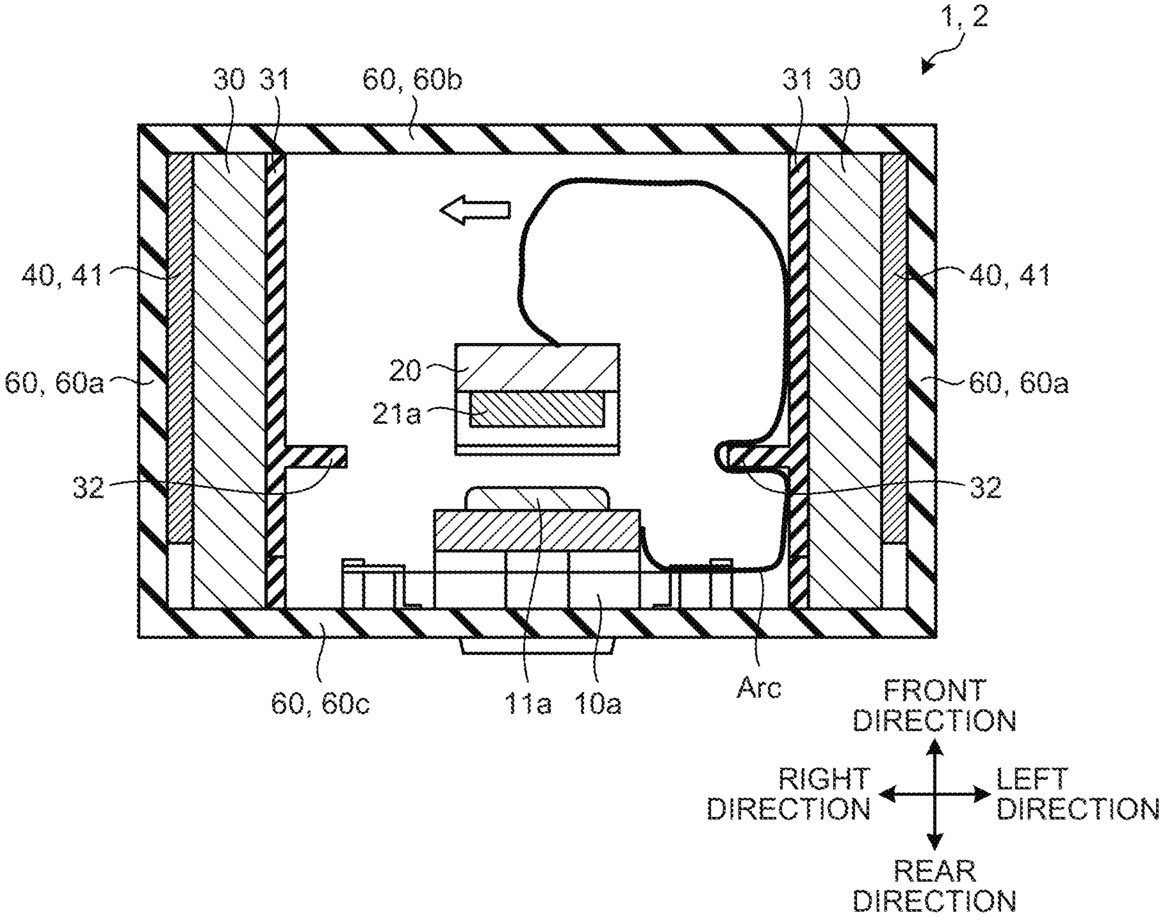
FIG. 28 is a cross-sectional view illustrating an example of a state of arc discharge in a switch in a case where an insulating plate is not provided.
Figure 29:
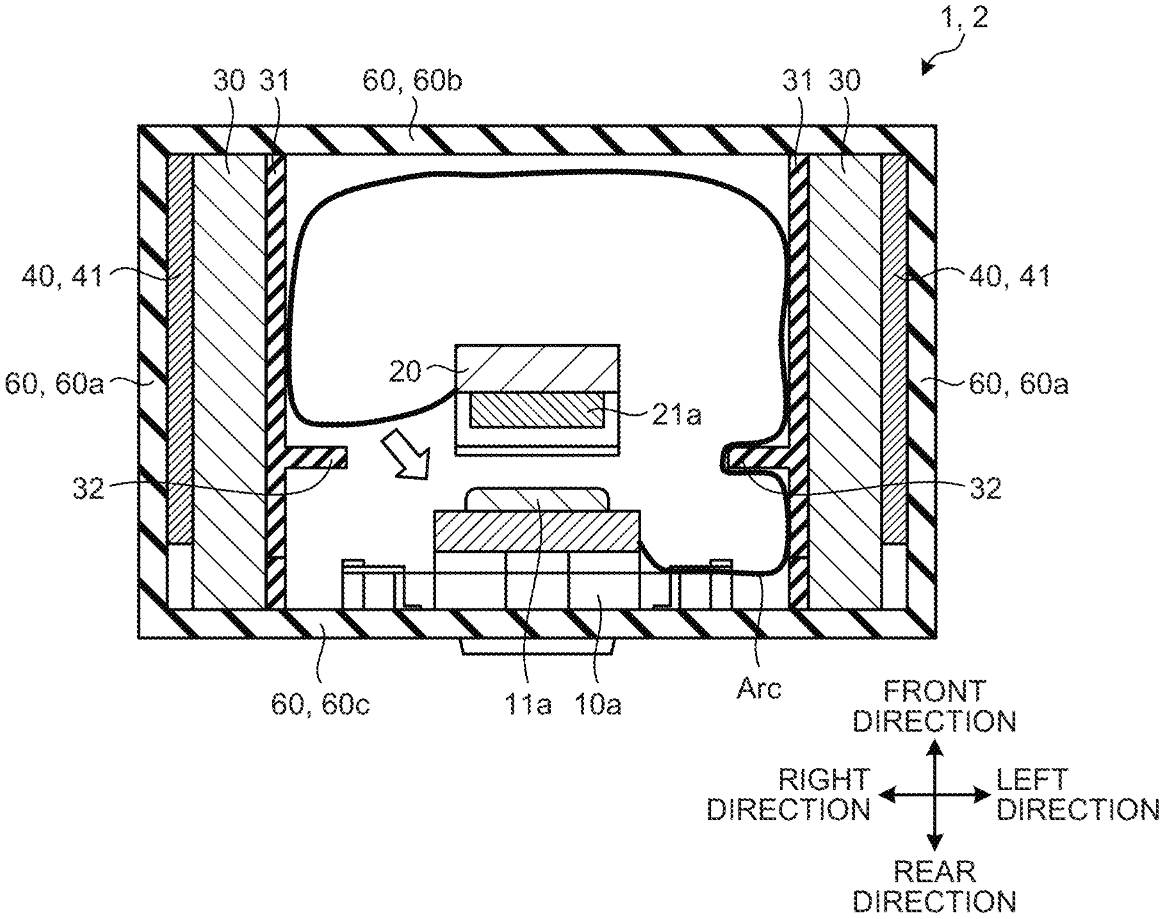
FIG. 29 is a cross-sectional view illustrating an example of a state of arc discharge in the switch in the case where the insulating plate is not provided.

Here, an effect yielded by the provision of the insulating plate 62 will be described. FIGS. 28 and 29 each are a cross-sectional view illustrating an example of a state of arc discharge in the switch in a case where the insulating plate is not provided. FIGS. 28 and 29 correspond to, for example, the cross-sectional view taken along a line XXIV-XXIV in FIG. 23 of the sixth embodiment. The switch 1 in FIGS. 28 and 29 is the switch 1 described in the sixth embodiment, and is in a case where the insulating plate 62 is not provided on the front surface 60*b* inside the cover 60.

In the case where the insulating plate 62 is not provided, the arc discharge Arc is caused between the movable contacts 21*a* and 21*b* and the fixed contacts 11*a* and 11*b* as illustrated in FIG. 28, and when the arc discharge Arc is driven toward the permanent magnet 30 side, the arc discharge Arc is stretched by the convex portion 32 of the insulating resin 31. The arc discharge Arc moves in the rightward direction in FIG. 29 in a space between the movable contactor 20 and the front surface 60*b* of the cover 60 as illustrated in FIG. 29 further from a state of FIG. 28. When the electric current is large, a high-temperature gas generated by the arc discharge Arc is sprayed onto the first movable contact 21*a* and the first fixed contact 11*a*, so that the arc discharge Arc may return again between the first movable contact 21*a* and the first fixed contact 11*a*. As described above, in the case where the insulating plate 62 is not provided, degradation of the arc interruption performance may be caused.

Figure 30:
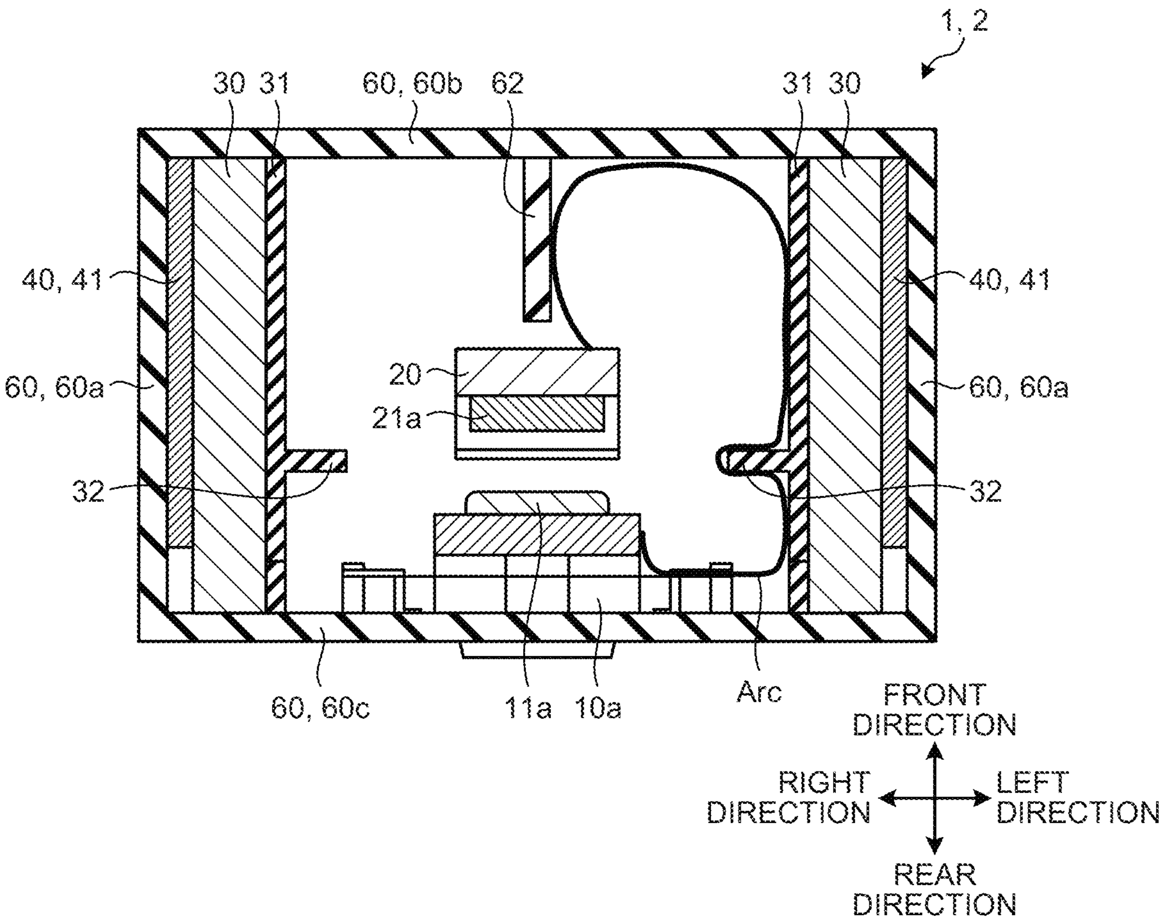
FIG. 30 is a cross-sectional view illustrating an example of a state of arc discharge in the switch according to the ninth embodiment.

FIG. 30 is a cross-sectional view illustrating an example of a state of arc discharge in the switch according to the ninth embodiment. FIG. 30 corresponds to, for example, the cross-sectional view taken along a line XXIV-XXIV in FIG. 23 of the sixth embodiment. As illustrated in FIG. 30, the switch 1 of the ninth embodiment has, provided therein, includes the insulating plate 62 protruding from the front surface 60*b* toward the movable contactor 20 side and extending in the up-down direction, in the space between the movable contactor 20 and the front surface 60*b* of the cover 60, so that movement of the arc discharge Arc in the left-right direction is restricted. As a result, it is possible to obtain an effect that high arc interruption performance can be maintained in addition to the effects of the first to seventh embodiments.

Note that it is desirable that the movable contactor 20 and the insulating plate 62 are positioned at a predetermined interval not to collide with each other when the movable contactor 20 moves in the front-rear direction. On the other hand, when the interval is too large, the effect of restricting the movement of the arc discharge Arc is reduced, and thus, the interval between the movable contactor 20 and the insulating plate 62 in a state where the movable contacts 21*a* and 21*b* are not in contact with the fixed contacts 11*a* and 11*b* is desirably less than or equal to 5 mm.

Tenth Embodiment

Figure 31:
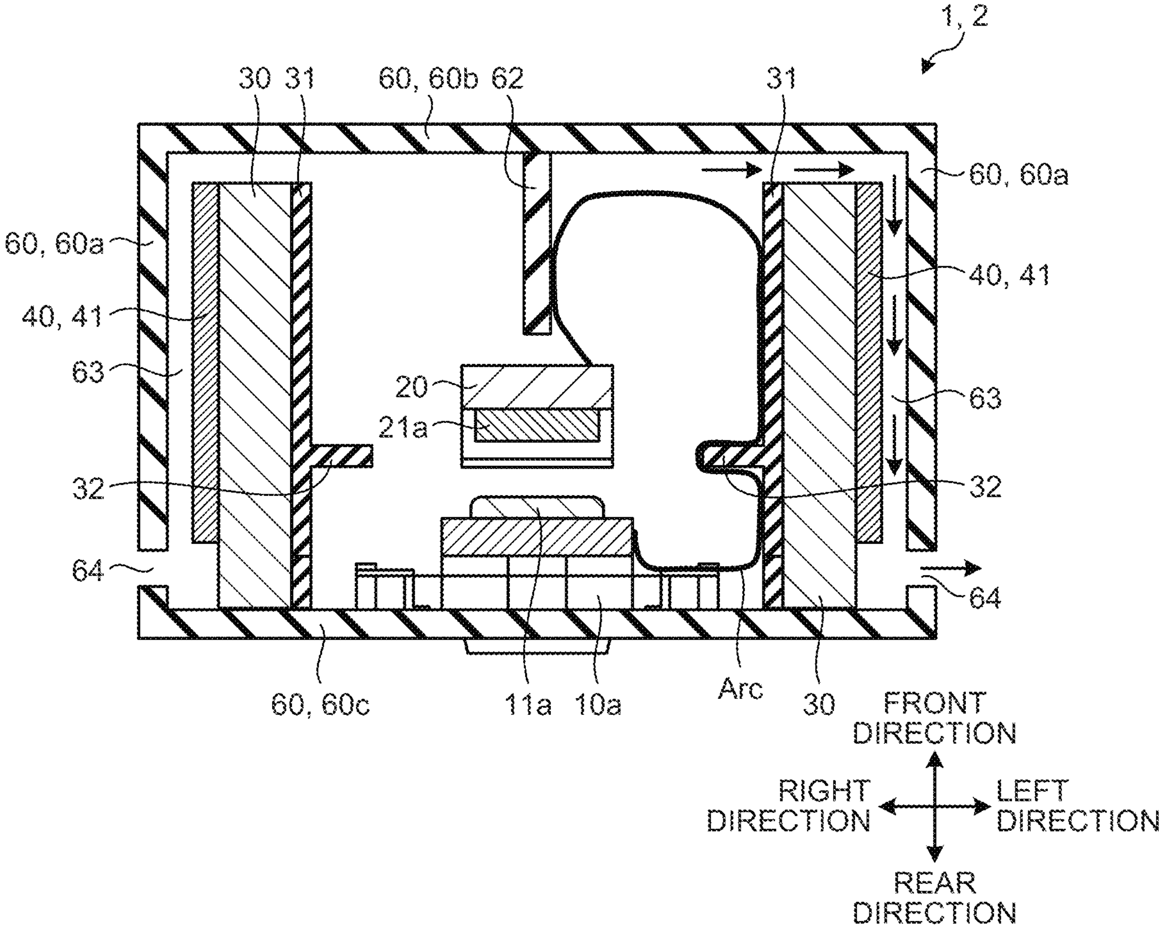
FIG. 31 is a cross-sectional view illustrating an example of an internal configuration of an arc-extinguishing chamber of a switch according to a tenth embodiment.

FIG. 31 is a cross-sectional view illustrating an example of an internal configuration of an arc-extinguishing chamber of a switch according to a tenth embodiment. FIG. 31 corresponds to, for example, the cross-sectional view taken along a line XXIV-XXIV in FIG. 23 of the sixth embodiment. Note that, in the following, differences from the first to ninth embodiments will be mainly described, and the same components as those in the first to ninth embodiments will be denoted by the same reference symbols, and description thereof will be omitted.

In the switch 1 of the tenth embodiment, the cover 60 further includes an exhaust port 64. In an example, the exhaust port 64 is provided in the side surface 60*a* of the cover 60. In addition, in FIG. 31, the exhaust port. 64 is provided at an end portion of the side surface 60*a* on a rear surface 60*c* side. FIG. 31 illustrates an example in which the exhaust port 64 is provided in the side surface 60*a* perpendicular to the left-right direction, but the exhaust port 64 may be provided in a side surface perpendicular to the up-down direction. In addition, FIG. 31 illustrates an example in which two exhaust ports 64 are provided, but it is sufficient that at least one exhaust port 64 is provided.

The switch 1 of the tenth embodiment includes, inside the cover 60, a gas flow path 63 that is formed between the outer surface of the magnetic yoke 40 and the inner surface of the cover 60 and guides gas to the exhaust port 64 along the front, surface 60*b* and the side surface 60*a* inside the cover 60. In the example of FIG. 31, the cover 60 is disposed, in the front-rear direction, to be in contact with an end portion of the magnetic yoke 40 on a side where the fixed contactors 10*a* and 10*b* are placed and not to be in contact with another end portion of the magnetic yoke 40 on a side where the movable contactor 20 is placed. That is, the gas flow path 63 is provided to bypass a direction of the movable contacts 21*a* and 21*b* when viewed from the fixed contacts 11*a* and 11*b*.

Specifically, the gas flow path 63 is provided, inside the cover 60, as a space between the left and right side surfaces 60*a* and the magnetic yoke 40. In addition, the gas flow path 63 is provided, inside the cover 60, as a space between the front surface 60*b* of the cover 60 and end portions of the magnetic yoke 40, the permanent magnet 30, and the insulating resin 31 on the front direction side. Note that the gas flow path 63 may be provided, inside the cover 60, as a space between a side surface in the up-down direction and the magnetic yoke 40. As described above, the cover 60 is set in such a manner that the side surfaces of the magnetic yoke 40 in the left-right direction and the end portion of the magnetic yoke 40 in the front direction do not come into contact with the cover 60.

A gas generated by the arc discharge Arc flows through the gas flow path 63, and the gas is exhausted from the exhaust port 64 to the outside of the cover 60.

In the above description, a case has been described where the gas flow path 63 and the exhaust port 64 are provided in the configuration of the ninth embodiment, but the gas flow path 63 and the exhaust port 64 may be similarly provided in the configurations of the first to eighth embodiments.

In the tenth embodiment, the cover 60 is provided with the gas flow path 63 provided along the front surface 60*b* and the side surface 60*a* inside the cover 60, and the exhaust port 64 connected to the gas flow path 63. As a result, when the internal pressure of the cover 60 increases due to the gas generated by the arc discharge Arc, the generated gas is guided to the gas flow path 63 and exhausted from the exhaust port 64, and thereby the driving force for inducing the arc discharge Arc in the extending direction thereof can be obtained. For this reason, the arc discharge Arc can be extended more quickly, and the interruption performance can be improved. In addition, since the increase in internal pressure can be reduced, the strength of the cover 60 is allowed to be reduced as compared with a case where the gas flow path 63 and the exhaust port 64 are not provided in the cover 60, and it is possible to obtain an effect that the cost for manufacturing the switch 1 can be reduced in addition to the effects of the first to ninth embodiments.

Further, the gas flow path 63 is provided to bypass the direction of the movable contacts 21*a* and 21*b* when viewed from the fixed contacts 11*a* and 11*b*. As a result, for example, in a case where some foreign matter enters from the outside via the exhaust port 64, the foreign matter can be prevented from reaching the vicinity of the movable contacts 21*a* and 21*b* and the fixed contacts 11*a* and 11*b*, and the reliability of contact between the contacts can be improved.

The configurations described in the above embodiment illustrate examples of contents of the present invention, and can each be combined with other publicly known techniques and partially omitted and/or modified without departing from the scope of the present invention.

Note that the above-described embodiments disclosed herein are illustrative in all respects, and do not provide a basis for restrictive interpretation. Therefore, the technical scope of the present invention is not to be construed only by the above-described embodiments. In addition, meanings equivalent to the claims and all modifications within the scope are included herein.

REFERENCE SIGNS LIST

1 switch; 2, 2*a*, 2*b* arc-extinguishing chamber; 10*a* first fixed contactor; 10*b*, 10*c* second fixed contactor; 11*a* first fixed contact; 11*b* second fixed contact; 12*a*, 12*b* terminal; 20, 20A movable contactor; 21*a* first movable contact; 21*b* second movable contact; 21*c* movable contact; 30 permanent magnet; 31 insulating resin part; 32 convex portion; 40 magnetic yoke; 41 L-shaped member; 41A U-shaped member; 42, 42*a*, 42*b*, 42*c* protrusion; 43 notch; 50 flexible conductor; 60 cover; 61 resin plate; 62 insulating plate; 63 gas flow path; 64 exhaust port; 411 first component; 412 second component; 413 third component.

The invention claimed is:

1. A switch comprising:

a first fixed contactor including a first fixed contact;

a second fixed contactor disposed at an interval in a first direction aligned with the first fixed contactor;

a movable contactor extending in the first direction, including a first movable contact provided at a position facing the first fixed contact at a first end portion, and provided to be able to come into contact with and separate from the first fixed contactor in a second direction perpendicular to the first direction;

at least a pair of permanent magnets arranged to sandwich the movable contactor and to cause their surfaces facing the movable contactor in a third direction perpendicular to the first direction and the second direction of the movable contactor to have an identical polarity; and a yoke made of a magnetic material surrounding a periphery of the movable contactor in the first direction and the third direction and connected to surfaces of the permanent magnets on opposite sides of surfaces facing the movable contactor, wherein the yoke includes a protrusion protruding toward the movable contactor at a position facing the first end portion of the movable contactor in the first direction, the protrusion being made of the same material as the yoke and continuous with the yoke.

2. The switch according to claim 1, wherein the yoke includes a plurality of L-shaped members including: a first component connected to one permanent magnet of the pair of permanent magnets and extending in the first direction; and a second component extending in the third direction from a position of the first component to a position of the movable contactor in the third direction, and the protrusion is provided at an end portion on the second component's side of the L-shaped member.

3. The switch according to claim 2, wherein the protrusion is configured by bending the end portion of the L-shaped members on the second component's side toward the movable contactor's side in the first direction.

4. The switch according to claim 3, wherein the L-shaped member includes a notch in a part of the protrusion in the second direction.

5. The switch according to claim 1, wherein the yoke includes a U-shaped member including: a first component connected to one permanent magnet of the pair of permanent magnets and extending in the first direction; a second component connected to an end portion of the first component in the first direction and extending in the third direction; and a third component connected to the other permanent magnet of the pair of permanent magnets, connected to an end portion of the second component in the third direction, and extending in the first direction.

6. The switch according to claim 1, further comprising an insulating resin part to cover a surface of the yoke on the movable contactor's side.

7. The switch according to claim 6, wherein the insulating resin part includes a convex portion extending in the first direction and protruding toward the movable contactor's side.

8. The switch according to claim 1, wherein the second fixed contactor includes a second fixed contact, and the movable contactor includes a second movable contact provided at a position facing the second fixed contact, at a second end portion on an opposite side of the first end portion in the first direction.

9. The switch according to claim 1, further comprising a conductor to electrically connect the movable contactor to the second fixed contactor and to cause the second fixed contactor to support the movable contactor, at a second end portion of the movable contactor on an opposite side from the first end portion in the first direction.

10. The switch according to claim 1, further comprising a resin plate made of a thermally decomposable polymer material and disposed at an interval from the movable contactor, on an opposite side of the first movable contact with respect to the movable contactor.

11. The switch according to claim 1, further comprising an insulating plate extending in the first direction and the second direction and disposed along the first direction, at an interval from the movable contactor, on an opposite side of the first movable contact with respect to the movable contactor.

12. The switch according to claim 1, further comprising a cover to cover the first direction, the second direction, and the third direction of a space in which the movable contactor, the pair of permanent magnets, and the yoke are arranged, wherein the cover includes:

an exhaust port; and a gas flow path connected to the exhaust port and formed between an outer surface of the yoke and an inner side surface of the cover.

13. The switch according to claim 12, wherein the exhaust port is provided on a side where the first fixed contactor and the second fixed contactor are disposed, in the second direction of a side surface of the cover and the cover is disposed, in the second direction, to be in contact with an end portion of the yoke on a side where the first fixed contactor and the second fixed contactor are disposed, and not to be in contact with an end portion of the yoke on a side where the movable contactor is disposed.

* * * * *